US012380038B1

(12) United States Patent
Thiruchengode Vajravel et al.

(10) Patent No.: US 12,380,038 B1
(45) Date of Patent: Aug. 5, 2025

(54) SYSTEM AND METHOD FOR MANAGING AND ORCHESTRATING A COLLABORATION PERIPHERAL DEVICE WORKSPACE WITH ADAPTIVE MESHES

(71) Applicant: Dell Products, LP, Round Rock, TX (US)

(72) Inventors: Gokul Thiruchengode Vajravel, Bangalore (IN); Srinivasa Ragavan Rajagopalan, Bangalore (IN); Vivek Viswanathan Iyer, Saint Johns, FL (US)

(73) Assignee: DELL PRODUCTS LP, Round Rock, TX (US)

( * ) Notice: Subject to any disclaimer, the term of this patent is extended or adjusted under 35 U.S.C. 154(b) by 14 days.

(21) Appl. No.: 18/430,470

(22) Filed: Feb. 1, 2024

(51) Int. Cl.
*G06F 15/177* (2006.01)
*G06F 1/26* (2006.01)
*G06F 13/10* (2006.01)

(52) U.S. Cl.
CPC .............. *G06F 13/10* (2013.01); *G06F 1/266* (2013.01); *G06F 2213/40* (2013.01)

(58) Field of Classification Search
CPC ....... G06F 13/10; G06F 1/266; G06F 2213/40
See application file for complete search history.

(56) References Cited

U.S. PATENT DOCUMENTS

| | | |
|---|---|---|
| 9,756,547 B2 | 9/2017 | Egner |
| 9,780,823 B2 | 10/2017 | Egner |
| 11,310,304 B1 | 4/2022 | Iyer |
| 11,350,059 B1 * | 5/2022 | Swierk ................. G06V 40/168 |
| 12,047,282 B2 * | 7/2024 | Ramaswamy ........ H04L 45/123 |
| 2001/0013055 A1 * | 8/2001 | Kojima ................... G06F 9/505 709/205 |
| 2016/0254968 A1 | 9/2016 | Ebtekar |
| 2020/0301690 A1 * | 9/2020 | Arya ...................... G06F 9/452 |
| 2021/0133318 A1 | 5/2021 | Andrews |
| 2022/0198043 A1 | 6/2022 | Kozlowski |
| 2022/0300313 A1 | 9/2022 | Iyer |

(Continued)

FOREIGN PATENT DOCUMENTS

WO    WO-2009062024 A1 *    5/2009    .......... H04L 63/162

*Primary Examiner* — Cheng Yuan Tseng
(74) *Attorney, Agent, or Firm* — Prol Intellectual Property Law, PLLC; H. Kenneth Prol

(57) ABSTRACT

A peripheral device workspace cloud orchestrator server includes a hardware processor, a memory device, and a network interface device to receive operational capabilities and settings associated with a peripheral device node operatively coupled to an anchor information handling system node, the anchor information handling system node and peripheral device forming part of a collaborative peripheral device workspace to be registered with the peripheral device workspace cloud orchestrator server. The hardware processor executes a collaborative workspace orchestrator module to register the peripheral device node within the collaborative peripheral device workspace. The hardware processor executes computer code of mesh manager module to identify and create a mesh within the collaborative peripheral device workspace including the anchor information handling system node and registered peripheral device node in a mesh manifest, the mesh created based on the KPIs of the registered peripheral device and assigned a mesh ID value.

20 Claims, 9 Drawing Sheets

(56) References Cited

U.S. PATENT DOCUMENTS

| | | |
|---|---|---|
| 2022/0391498 A1 | 12/2022 | Andrews |
| 2023/0056042 A1 | 2/2023 | Vichare |
| 2023/0080498 A1 | 3/2023 | Barhoumeh |
| 2023/0134096 A1 | 5/2023 | Boyapalle |
| 2023/0222200 A1 | 7/2023 | Grobelny |
| 2023/0325522 A1 | 10/2023 | Kozlowski |
| 2024/0020212 A1 | 1/2024 | Andrews |

* cited by examiner

SYSTEM AND METHOD FOR MANAGING AND ORCHESTRATING A COLLABORATION PERIPHERAL DEVICE WORKSPACE WITH ADAPTIVE MESHES

FIELD OF THE DISCLOSURE

The present disclosure generally relates to automatic managing and configuration of information handling system nodes and peripheral device nodes for use in a user's peripheral device workspace. The present disclosure more specifically relates to managing and orchestrating a peripheral device workspace in a collaborative scenario for plural user information handling systems that are part of an adaptive mesh within the formed peripheral device workspace.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. The information handling system may be used to execute instructions of one or more applications such as a gaming application or work-related productivity applications. Further, the information handling system may be operatively coupled to a plurality of peripheral devices at a location and the information handling system may be operatively coupled to a cloud server information handling system via a network connection.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
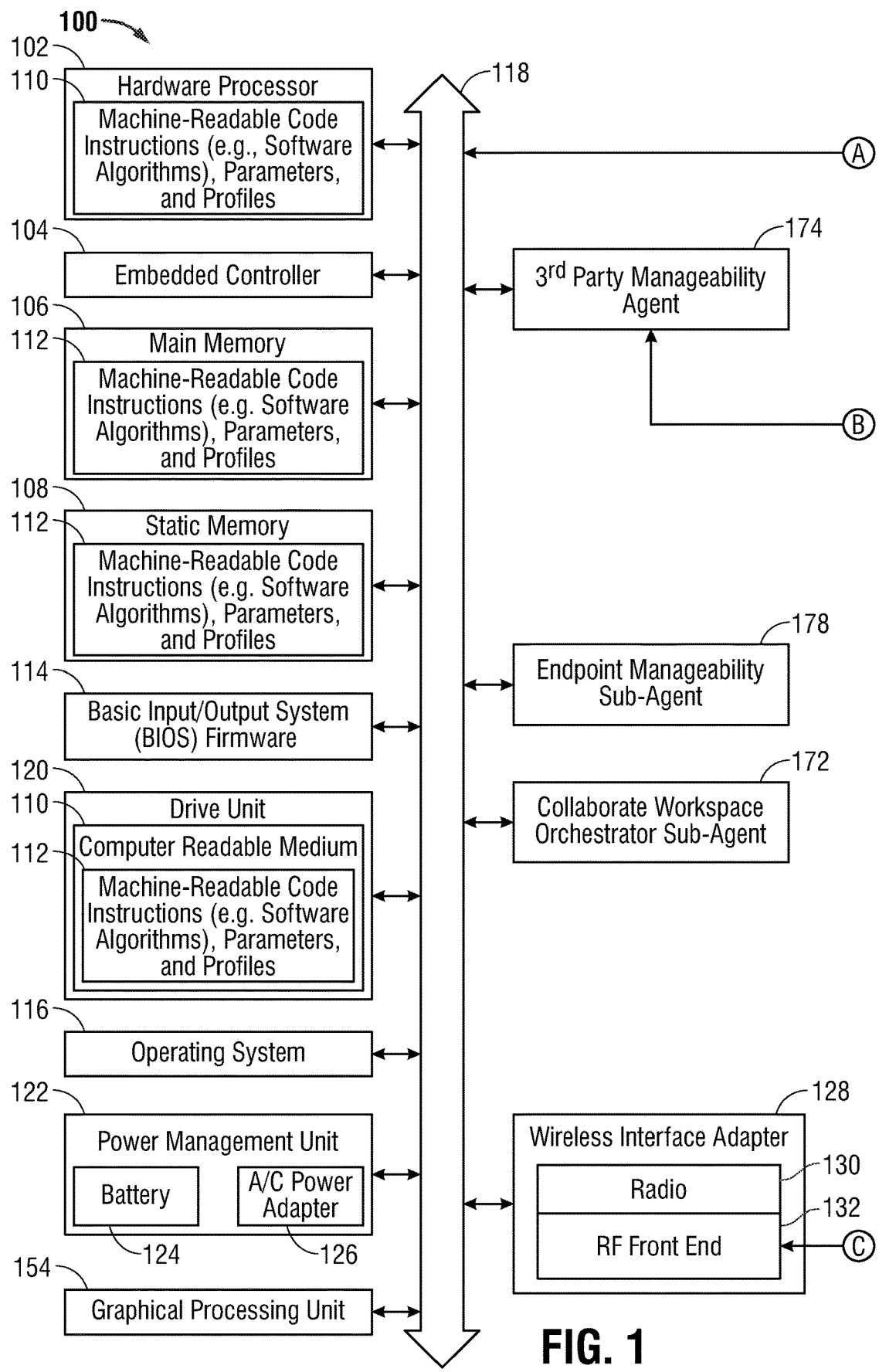
FIG. 1 is a block diagram illustrating an information handling system operatively coupled to a remotely located peripheral device workspace cloud orchestrator server according to an embodiment of the present disclosure.
Figure 1:
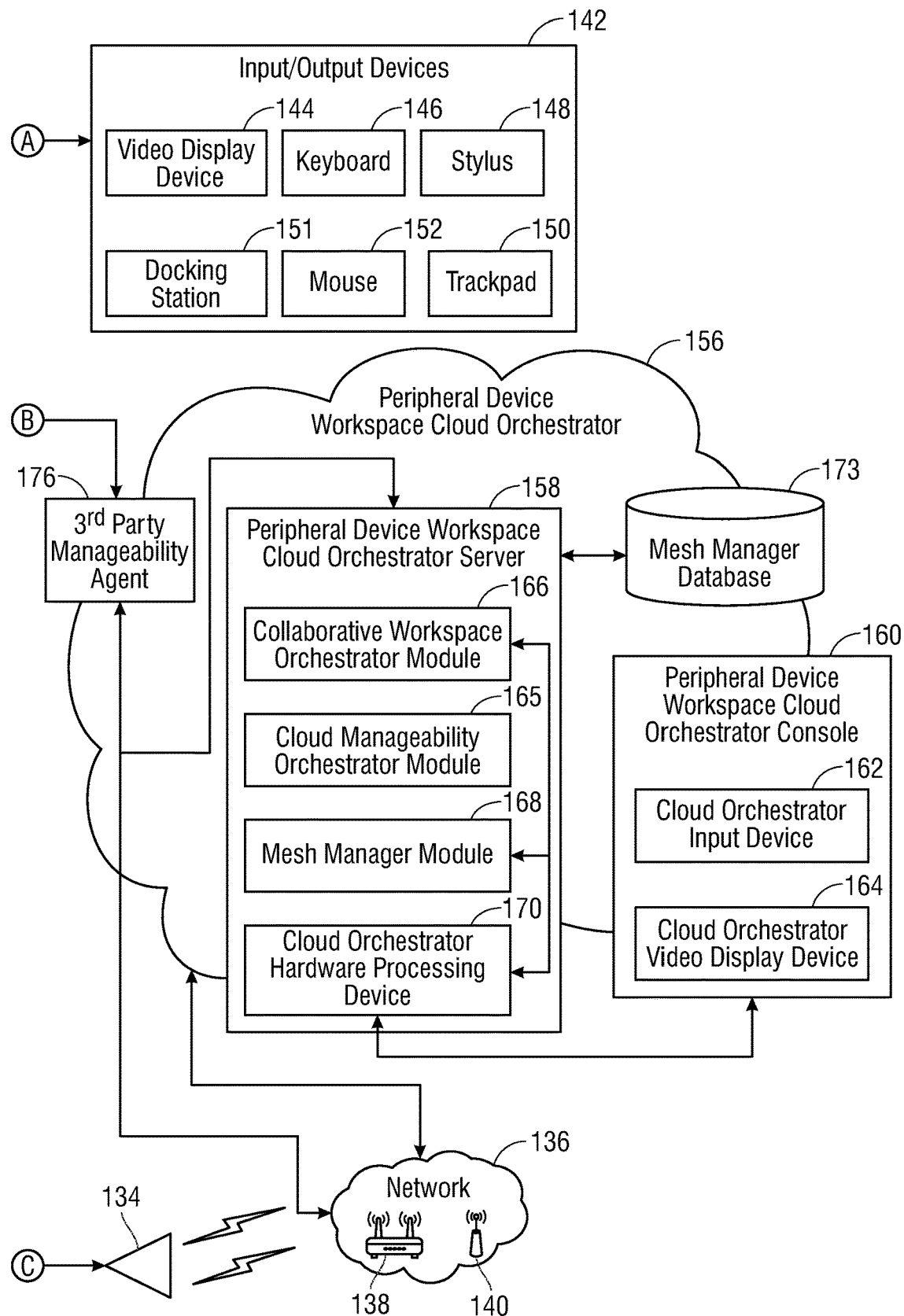

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

A user may oftentimes use an information handling system at a physical location in a peripheral device workspace. In this context, a peripheral device workspace can be viewed as an environment that includes a location identifier and a user information handling system (e.g., a laptop) as an anchor or primary or anchor node with one or more peripheral devices as peripheral device nodes also referred to as peripherals that are connected to the user information handling system at the identified location. In an embodiment, each of the information handling systems and peripheral devices within these peripheral device workspaces may be referred to as node devices and form part of these peripheral device workspaces. According to embodiments herein, a formed peripheral device workspace may oftentimes be used for various work scenarios. For example, a business may have an office space that includes hoteling cubes that can be assigned to, reserved by, or otherwise utilized by the business' employees as peripheral device workspaces for use with one or more peripheral devices and an information handling system introduced to the peripheral device workspace for the duration it is used by the identified user, for example, a business' employee. In such an example case, the business may allow its individual employees to connect their laptops to a dock in a particular hoteling cube having a formed peripheral device workspace where various external peripherals may be available for use. Users may also employ other peripheral device workspaces when working from home or other locations and the information handling system and some portion of the external peripheral devices may travel with the user to one or more of the identified peripheral device workspaces that a particular user may enter and use. In additional embodiments, the peripheral device workspace may include a peripheral device collaborative or peripheral device collaboration workspace. A peripheral device collaborative workspace may include an ecosystem of peripheral devices and information handling systems that may have the capability of allowing more than one user operating more than one smart device or user information handling system to be active at any given time in the peripheral device collaborative workspace. Smart devices, in the embodiments herein, may refer to any node peripheral device or information handling system node that is capable of being operatively coupled to a network and has hardware processing capability.

In embodiments herein, any number of users of a collaborative workspace may join and leave this collaborative workspace allowing for the formation of a dynamic collaborative workspace. Further, each of the plurality of users in a peripheral device collaborative workspace may be designated to use all or may be limited to any subset of peripheral device nodes. Such subsets of peripheral device nodes and user information handling system nodes may form meshes defined in the peripheral device collaborative workspace and identified and stored by execution of code instructions of a peripheral device workspace cloud orchestrator having a collaborative workspace orchestrator module according to embodiments herein.

In an embodiment, one or more meshes may be created or defined within a peripheral device collaborative workspace that includes a collection of nodes (e.g., the information handling system and peripheral devices) delineated within a logical group with a mesh owner in a peripheral device workspace. The nodes within each of the formed meshes may be logically grouped based on, for example, key performance indicators (KPIs) that may include processing performance KPIs, battery availability KPIs, audio KPIs, video KPIs, and the like for assessment of function or suitability of peripheral device nodes within these meshes within the peripheral device network. The peripheral device workspace with the plurality of meshes formed therein may be part of the peripheral device collaborative workspace that allows another user with a separate or second information handling system to collaborate with a first user of a first information handling system and one or more collaborative peripheral device nodes. The first and second information handling systems may each be considered, in the context of the present specification, a primary or anchor node that are each capable of communicating with a cloud server such as a peripheral device workspace cloud orchestrator server described herein. Additionally, peripheral device nodes may commonly include, in some embodiments, internal or external devices such as displays, a keyboard, a mouse, a webcam, a printer, a speaker, a fingerprint scanner, a trackpad, and a stylus, among others. Further, some peripheral device nodes may be input/output (I/O) peripheral devices that may be integrated peripheral devices in a primary information handling system node (e.g., a laptop) in addition to the separate, external peripheral device nodes. Because some of these peripheral devices may be shared for collaboration within the peripheral device collaborative workspace, subsets of the peripheral device nodes are used to help define the meshes having mesh manifests of the subsets created within the peripheral device collaborative workspace. For example, where the peripheral device collaborative workspace includes a conference room, a collaborative video display device or collaborative projector may be shared and used by any user to manipulate a graphical user interface, for example. Each user within their own created mesh may operate a wired or wireless mouse, a keyboard, a microphone, a webcam, and the like as well as a collaborative user display device or collaborative projector to collaborate with other users also implementing their respective input/output devices in distinct meshes that may crossover for some collaborative peripheral device nodes. This allows the formed meshes to be defined, in the example, as each being associated with a single user with some additional peripheral devices in a mesh manifest acting as a common collaborative peripheral device nodes and in plural mesh manifests as described.

However, it may be difficult for a user operatively coupling their information handling system or smart devices to the peripheral device collaborative workspace (e.g., by connecting a laptop to a docking station operatively coupled to a conference room system with plural peripheral devices) to discover, enumerate, request, and connect their information handling system and plural peripheral devices to this peripheral device collaborative workspace. For example, each of the user's peripheral devices and information handling systems may be managed by a different management provider that is responsible for propagating software/firmware updates, peripheral device setting policies, information handling system settings policies, and collaborative workspace policies, some of which may be particular to specific users. This may make manageability of each individual device node difficult. According to embodiments described herein, the creation of appropriate meshes within the peripheral device collaborative workspace facilitates application of policies among peripheral device nodes in the peripheral device collaborative workspace that may differ among multiple users.

The present specification describes embodiments of a computer-readable program code of a collaborative workspace orchestrator module that, when executed by a hardware processor of one or more peripheral device cloud orchestrator servers, identifies and creates the meshes within the peripheral device collaborative workspace such that software/firmware updates, peripheral device setting policies, information handling system settings policies, and collaborative workspace policies are propagated quickly and efficiently down to each peripheral device, smart device, and information handling system within each mesh of the peripheral device collaborative workspace and based on or coordinated among plural users. Execution of the computer-readable program code of the collaborative workspace orchestrator module directs registering information handling systems to send the capabilities and settings associated with each peripheral device operatively coupled to the information handling systems and the information handling systems themselves. The software/firmware update status, peripheral device capabilities, connectivity settings or options, existing peripheral device or information handling system settings policies, and existing collaborative workspace policies are also collected and sent, as well, to the collaborative workspace orchestrator module. Still further, execution of the computer-readable program code collaborative workspace orchestrator module directs each of the registering information handling systems to send key performance indicators (KPIs) associated with the operation of each operatively coupled peripheral device and the information handling system itself. With the capabilities, settings, and KPI data received, the collaborative workspace orchestrator module may execute computer-readable program code of a mesh manager module to identify and create meshes for one or more users within the collaborative workspace orchestrator module. The created meshes may be associated with a mesh identification (ID) for a user and stored on a mesh database for later use and implementation when the peripheral device collaborative workspace receives requests from registering information handling systems to join the peripheral device collaborative workspace or leave the peripheral device collaborative workspace. The mesh identification (ID) for a created mesh may include a subset of one or more peripheral device nodes in a mesh manifest among a wider plurality of peripheral device nodes in the collaborative peripheral device workspace in an embodiment. Further, the mesh and mesh ID may be associated with one or more collaborative peripheral device nodes that may be associated or used by plural meshes, and included partly within plural meshes, in the collaborative peripheral device workspace. Each mesh may also be associated with an anchor information handling system node as part of a mesh manifest in some embodiments when one is present. Thus, a user with the anchor information handling system node may operate in a designated mesh within the collaborative peripheral device workspace in embodiments herein. Within the peripheral device workspaces, new the software/firmware updates, changes or implementation of peripheral device setting policies, information handling system settings policies, and collaborative workspace policies are also generated and sent, as well, to the collaborative workspace orchestrator module and may be directed to particular meshes.

Execution of computer-readable program code of the collaborative workspace orchestrator module may also detect when settings, parameters, and/or characteristics of each of the nodes or primary or anchor node information handling system within each of the meshes of the peripheral device collaborative workspace change or are to be changed. Further, execution of computer-readable program code of the collaborative workspace orchestrator module may also detect when settings, parameters, and/or characteristics of each of the collaborative nodes, such as collaborative peripheral devices shared by plural primary or anchor node information handling systems between each of the meshes of the peripheral device collaborative workspace change or are to be changed to meet operational policy for each of the plural primary or anchor node information handling systems or other nodes in each of the meshes. The collaborative workspace orchestrator module, in an embodiment, may determine if these changes in the settings, parameters, and/or characteristics of each of the peripheral device nodes conform to peripheral device collaborative workspace policies as directed by the ITDM. Where these changes do not conform to the policies defined by the ITDM, the peripheral devices node may be removed from the mesh and its mesh manifest formed within the peripheral device collaborative workspace.

Still further, if the collaborative workspace orchestrator module determines that the changes to the settings, parameters, and/or characteristics of each of the peripheral device nodes hinders or reduces the user experience for a user in a mesh, the peripheral device node may be removed from the mesh created within the peripheral device collaborative workspace. For example, where the ITDM has set a policy that any information handling system registering with the collaborative workspace orchestrator module to join a conference room peripheral device collaborative workspace must have a mutable microphone and that the microphone, at least initially, is to be muted, any information handling system/microphone or microphone peripheral device node may be prevented from registering to join the peripheral device collaborative workspace if these capabilities are not met. In other example embodiments, where an ITDM has set a policy for each information handling system having a webcam or a webcam peripheral device node that is registering to join a peripheral device collaborative workspace in a conference room must be active and showing the participant, any violation of this policy may cause the collaborative workspace orchestrator module to remove the webcam peripheral device node and/or the information handling system to be removed. In a further embodiment, where a policy from the ITDM indicates that each node within each created mesh of the peripheral device collaborative workspace may not access outside networks other than the peripheral device collaborative workspace, the collaborative workspace orchestrator module may remove those peripheral device nodes or main information handling system nodes from the peripheral device collaborative workspace and disable operation with device nodes therein.

As such, an ITDM may set policies that cause the collaborative workspace orchestrator module to determine which primary or anchor node information handling systems and which peripheral device nodes may be used to form one or more meshes within a peripheral device collaborative workspace and under what conditions they may operate within the peripheral device collaborative workspace. This allows for the secure method of onboarding individual device nodes within peripheral device collaborative workspace and provide adaptive mesh management during the collaborative process. The execution of the collaborative workspace orchestrator module also provides for the ability to support smart devices such as information handling system primary or anchor nodes and peripheral devices as peripheral device nodes to be formed within a mesh of the peripheral device collaborative workspace. The execution of the collaborative workspace orchestrator module also restrains the operation of these smart devices information handling system nodes and peripheral device nodes based on policies created by the ITDM and provided to the collaborative workspace orchestrator module for execution among meshes defined therein in other embodiments. In further embodiments, the execution of the collaborative workspace orchestrator module provides for a single point where the ITDM may manage the federation of these smart devices information handling system nodes and peripheral device nodes despite having varied endpoint management providers (e.g., SCCM, InTune®, WS1, etc.).

Turning now to the figures, FIG. 1 illustrates an information handling system 100 similar to the information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP) 138, a base station transceiver 140, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality. It is appreciated that, in some embodiments herein, the information handling system 100 may be one of a plurality of device smart nodes or user information handling system nodes as part of a collaborative peripheral device workspace, a peripheral device workspace, or one or more peripheral device workspace cloud orchestrator servers 158 that are operatively coupled to a peripheral device workspace cloud orchestrator consol 160 in the peripheral device workspace cloud orchestrator 156 described herein. In an embodiment, the cloud orchestrator consol 160 may be an information handling system 100 itself that is used by an internet technology decision maker (ITDM) to create hardware device operational policies with one or more peripheral device workspace cloud orchestrator servers 158 to be propagated down to node devices within a collaborative peripheral device workspace such as the information handling system 100, a docking station 151, video display device 144, keyboard 146, stylus 148, trackpad 150, mouse 152, and the like which may be attached or separate devices from information handling system 100 in embodiments described herein. In this embodiment, the information handling system 100, may receive the hardware device operational policies generated by the ITDM at the peripheral device workspace cloud orchestrator consol 160 via execution of code instructions of the cloud manageability orchestrator module 165 at the peripheral device workspace cloud orchestrator server 158 as described in embodiments herein.

Thus, in a networked deployment, the information handling system 100 may operate in the capacity of a client computer in a server-client network environment, or as a peer computer system in a peer-to-peer (or distributed) network environment. In an embodiment, the information handling system 100 may be implemented using electronic devices that provide voice, video, or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or plural sets, of instructions to perform one or more computer functions.

The information handling system 100 may include main memory 106, (volatile (e.g., random-access memory, etc.), or static memory 108, nonvolatile (read-only memory, flash memory etc.) or any combination thereof), one or more hardware processing resources, such as a hardware processor 102 that may be a central processing unit (CPU), a graphics processing unit (GPU) 103, embedded controller (EC) 104, or any combination thereof. Additional components of the information handling system 100 may include one or more storage devices such as static memory 108 or drive unit 120. The information handling system 100 may include or interface with one or more communications ports for communicating with external devices, as well as various input and output (I/O) devices 142, such as a docking station 151, a mouse 152, a trackpad 150, a keyboard 146, a stylus 148, a video/graphics display device 144, or any combination thereof which may be internal or external devices in various embodiments. Portions of an information handling system 100 may themselves be considered information handling systems 100.

Information handling system 100 may include devices or modules that embody one or more of the devices or execute instructions for one or more systems and modules. The information handling system 100 may execute instructions (e.g., software algorithms), parameters, and profiles 112 that may operate on servers or systems, remote data centers, or on-box in individual client information handling systems according to various embodiments herein. In some embodiments, it is understood any or all portions of instructions (e.g., software algorithms), parameters, and profiles 112 may operate on a plurality of information handling systems 100. Example software or firmware sets of executable code instructions may include the peripheral device works space cloud orchestrator 156, the collaborative workspace orchestrator module 166, the cloud manageability orchestrator module 168, the mesh manager module 168, and the third party manageability platform 176 among others such as operating systems and the like on an information handling system 100 operating as a peripheral device workspace cloud orchestrator in some embodiments. Other example software or firmware sets of executable code instructions may include the collaborative workspace orchestrator sub-agent 172, the endpoint manageability sub-agent 178, and the third party manageability agent 174 among others such as operating systems 116 and the like on an information handling system 100 operating as an information handling system node at a peripheral device workspace in some embodiments.

The information handling system 100 may include the hardware processor 102 such as a central processing unit (CPU). Any of the processing resources may operate to execute code that is either firmware or software code. Moreover, the information handling system 100 may include memory such as main memory 106, static memory 108, and disk drive unit 120 (volatile (e.g., random-access memory, etc.), nonvolatile memory (read-only memory, flash memory etc.) or any combination thereof or other memory with computer readable medium 110 storing instructions (e.g., software algorithms), parameters, and profiles 112 executable by the EC 104, hardware processor 102, GPU 103, or any other hardware processing device. The information handling system 100 may also include one or more buses 118 operable to transmit communications between the various hardware components and peripheral devices such as any combination of various I/O devices 142 as well as between hardware processors 102, an EC 104, the operating system (OS) 116, the basic input/output system (BIOS) 114, the wireless interface adapter 128, or a radio module, among other components described herein. In an embodiment, the information handling system 100 may be in wired or wireless communication with the I/O devices 142 such as a docking station 151, a keyboard 146, a mouse 152, video display device 144, stylus 148, or trackpad 150 among other peripheral devices.

The information handling system 100 further includes a video/graphics display device 144. The video/graphics display device 144 in an embodiment may function as a liquid crystal display (LCD), an organic light emitting diode (OLED), a flat panel display, or a solid-state display. It is appreciated that the video/graphics display device 144 may be wired or wireless and may be an external video/graphics display device 144 that allows a user to increase the desktop area by extending the desktop in an embodiment. Additionally, as described herein, the information handling system 100 may include or be operatively coupled to one or more other I/O devices 142 including the wired or wireless mouse 152 described herein that allows the user to interface with the information handling system 100 via the video/graphics display device 144, a cursor control device (e.g., a trackpad 150, or gesture or touch screen input), a stylus 148, and/or a keyboard 146, among others. Information handling system 100 may also be operatively coupled to any peripheral device 142 such as a docking station 151 or other smart peripheral device having a hardware processing device such as a hardware processor, microcontroller, or other hardware processing resource and which may further be operatively coupled to one or more additional peripheral devices 142. As described herein, each of these input/output devices 142 may each be a node device associated with the information handling system 100 (referred to herein also as an anchor peripheral device node) and may be part of a peripheral device workspace on its own or a collaborative peripheral device workspace defined and identified with a peripheral device workspace identification value via execution of the collaborative workspace orchestrator module 166 and mesh manager module 168 as described herein. Various drivers and hardware control device electronics may be operatively coupled to operate the I/O devices 142 according to the embodiments described herein. The present specification contemplates that the I/O devices 142 may be wired or wireless.

A network interface device of the information handling system 100 shown as wireless interface adapter 128 can provide connectivity among devices such as with Bluetooth® or to a network 136, e.g., a wide area network (WAN), a local area network (LAN), wireless local area network (WLAN), a wireless personal area network (WPAN), a wireless wide area network (WWAN), or other network. In an embodiment, this network 136 may be operatively coupled to or include a peripheral device workspace cloud orchestrator 156 that includes one or more servers (e.g., peripheral device workspace cloud orchestrator server 158) or other computing devices that provide computer system resources as described herein that allow for the creation of peripheral device workspaces and orchestration of different node devices within one or more peripheral device workspaces. In embodiments described herein, the wireless interface device 128 with its radio 130, RF front end 132 and antenna 134 is used to communicate with the wireless peripheral devices via, for example, a Bluetooth® or Bluetooth® Low Energy (BLE) protocols. In an embodiment, the WAN, WWAN, LAN, and WLAN may each include an AP 138 or base station 140 used to operatively couple the information handling system 100 to a network 136. In a specific embodiment, the network 136 may include macro-cellular connections via one or more base stations 140 or a wireless AP 138 (e.g., Wi-Fi), or such as through licensed or unlicensed WWAN small cell base stations 140. Connectivity may be via wired or wireless connection. For example, wireless network wireless APs 138 or base stations 140 may be operatively connected to the information handling system 100. Wireless interface adapter 128 may include one or more radio frequency (RF) subsystems (e.g., radio 130) with transmitter/receiver circuitry, modem circuitry, one or more antenna radio frequency (RF) front end circuits 132, one or more wireless controller circuits, amplifiers, antennas 134 and other circuitry of the radio 130 such as one or more antenna ports used for wireless communications via multiple radio access technologies (RATs). The radio 130 may communicate with one or more wireless technology protocols.

In an embodiment, the wireless interface adapter 128 may operate in accordance with any wireless data communication standards. To communicate with a wireless local area network, standards including IEEE 802.11 WLAN standards (e.g., IEEE 802.11ax-2021 (Wi-Fi 6E, 6 GHz)), IEEE 802.15 WPAN standards, WWAN such as 3GPP or 3GPP2, Bluetooth® standards, or similar wireless standards may be used. Wireless interface adapter 128 may connect to any combination of macro-cellular wireless connections including 2G, 2.5G, 3G, 4G, 5G or the like from one or more service providers. Utilization of radio frequency communication bands according to several example embodiments of the present disclosure may include bands used with the WLAN standards and WWAN carriers which may operate in both licensed and unlicensed spectrums. The wireless interface adapter 128 can represent an add-in card, wireless network interface module that is integrated with a main board of the information handling system 100 or integrated with another wireless network interface capability, or any combination thereof.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a hardware controller or a hardware processor system. Further, in an exemplary, non-limited embodiment, implementations may include distributed hardware processing, component/object distributed hardware processing, and parallel hardware processing. Alternatively, virtual computer system processing may be constructed to implement one or more of the methods or functionalities as described herein.

The present disclosure contemplates a computer-readable medium that includes instructions, parameters, and profiles 112 or receives and executes instructions, parameters, and profiles 112 responsive to a propagated signal, so that a hardware device connected to a network 136 may communicate voice, video, or data over the network 136. Further, the instructions 112 may be transmitted or received over the network 136 via the network interface device or wireless interface adapter 128. It is appreciated that any computing device including the cloud orchestrator server 158, the cloud orchestrator console 160, and the information handling system 100 may include a computer-readable medium that includes instructions, parameters, and profiles 112.

The information handling system 100 may include a set of instructions 112 that may be executed to cause the computer system to perform any one or more of the methods or computer-based functions disclosed herein. For example, instructions 112 may be executed by a hardware processor 102, GPU 103, EC 104 or any other hardware processing resource and may include software agents, or other aspects or components used to execute the methods and systems described herein. Various software modules comprising application instructions 112 may be coordinated by an OS 116, and/or via an application programming interface (API). An example OS 116 may include Windows®, Android®, and other OS types. Example APIs may include Win 32, Core Java API, or Android APIs.

In an embodiment, the information handling system 100 may include a disk drive unit 120. The disk drive unit 120 and may include machine-readable code instructions, parameters, and profiles 112 in which one or more sets of machine-readable code instructions, parameters, and profiles 112 such as firmware or software can be embedded to be executed by the hardware processor 102 or other hardware processing devices such as a GPU 103 or EC 104, or other microcontroller unit to perform the processes described herein. Similarly, main memory 106 and static memory 108 may also contain a computer-readable medium for storage of one or more sets of machine-readable code instructions, parameters, or profiles 112 described herein. The disk drive unit 120 or static memory 108 also contain space for data storage. Further, the machine-readable code instructions, parameters, and profiles 112 may embody one or more of the methods as described herein. In a particular embodiment, the machine-readable code instructions, parameters, and profiles 112 may reside completely, or at least partially, within the main memory 106, the static memory 108, and/or within the disk drive 120 during execution by the hardware processor 102, EC 104, or GPU 103 of information handling system 100.

Main memory 106 or other memory of the embodiments described herein may contain computer-readable medium (not shown), such as RAM in an example embodiment. An example of main memory 106 includes random access memory (RAM) such as static RAM (SRAM), dynamic RAM (DRAM), non-volatile RAM (NV-RAM), or the like, read only memory (ROM), another type of memory, or a combination thereof. Static memory 108 may contain computer-readable medium (not shown), such as NOR or NAND flash memory in some example embodiments. The applications and associated APIs, for example, may be stored in static memory 108 or on the disk drive unit 120 that may include access to a machine-readable code instructions, parameters, and profiles 112 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of machine-readable code instructions. The term "computer-readable medium" shall also include any medium that is capable of storing, encoding, or carrying a set of machine-readable code instructions for execution by a processor or that cause a computer system to perform any one or more of the methods or operations disclosed herein.

In an embodiment, the information handling system 100 may further include a power management unit (PMU) 122 (a.k.a. a power supply unit (PSU)). The PMU 122 may include a hardware controller and executable machine-readable code instructions to manage the power provided to the components of the information handling system 100 such as the hardware processor 102 and other hardware components described herein. The PMU 122 may control power to one or more components including the one or more drive units 120, the hardware processor 102 (e.g., CPU), the EC 104, the GPU 103, a video/graphic display device 144, or other wired I/O devices 142 such as the mouse 152, the stylus 148, a keyboard 146, and a trackpad 150 and other components that may require power when a power button has been actuated by a user. In an embodiment, the PMU 122 may monitor power levels and be electrically coupled to the information handling system 100 to provide this power. The PMU 122 may be coupled to the bus 118 to provide or receive data or machine-readable code instructions. The PMU 122 may regulate power from a power source such as the battery 124 or AC power adapter 126. In an embodiment, the battery 124 may be charged via the AC power adapter 126 and provide power to the components of the information handling system 100, via wired connections as applicable, or when AC power from the AC power adapter 126 is removed.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium 110 can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or machine-readable code instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses hardware resources executing software or firmware, as well as hardware implementations.

As described herein, the information handling system 100 is operatively coupled to a peripheral device workspace cloud orchestrator 156 over a network that includes any number of servers, computing devices, and other cloud computing resources such as the peripheral device workspace cloud orchestrator server 158. The peripheral device workspace cloud orchestrator 156 may, therefore, execute on and include any hardware that may be distributed over multiple physical locations but act in concert with each other and specifically the peripheral device workspace cloud orchestrator server 158 to facilitate, for example, an ITDM to, via hardware device operational policies, cause a collaborative peripheral device workspace to be created that includes any number of node devices (e.g., including the information handling system 100 as an anchor node device) forming part of the collaborative peripheral device workspace after receiving device enrollment data describing one or more node devices. In an embodiment, the ITDM may also create hardware device operational policies that, based on the registered node devices detected within the one or more created collaborative peripheral device workspaces, facilitate the operations of the various nodes within the collaborative peripheral device workspace. In an embodiment, the ITDM may cause hardware device operational policies to be applied to the created collaborative peripheral device workspace. It is appreciated that the node devices described herein may include each of the peripheral devices operatively coupled to the information handling system 100 which acts as a primary or anchor information handling system node and the peripheral device workspaces created may be described and identified in a classification as a collaborative peripheral device workspace with their peripheral device workspace identification values.

The peripheral device workspace cloud orchestrator server 158 may be any computing device that may include similar elements as the information handling system 100 such as a memory device, a cloud orchestrator hardware processing device 170, a PMU, and other elements that allow the peripheral device workspace cloud orchestrator server 158 to execute computer-readable program code of the cloud manageability orchestrator module 165, collaborative workspace orchestrator module 166, and mesh manager module 168 and other software or firmware as described herein.

In an embodiment, the peripheral device workspace cloud orchestrator server 158 may be operatively coupled to a peripheral device workspace cloud orchestrator console 160. The peripheral device workspace cloud orchestrator console 160 may be used by the ITDM to create and propagate hardware device operational policies, track a lifecycle of ordered node devices, monitor for compliant and non-compliant node devices within a peripheral device workspace, propagate optimal settings for any give node device or types of node devices, monitor and provide recommended software/firmware updates to node devices, remediate software/firmware issues among the plurality of node devices, manage collaborative peripheral device workspace sessions (e.g., associate a user's identification with a peripheral device workspace), enable automatic security updates for node devices within the collaborative peripheral device workspaces, manage auto-pairing of node devices to other node devices within the collaborative peripheral device workspace, and troubleshoot and remediate node deceives from the cloud orchestrator console 160. It is appreciated that the peripheral device workspace cloud orchestrator console 160 may include a cloud orchestrator input device 162 and a cloud orchestrator video display device 164 that allows the ITDM to complete these processes and engage with the peripheral device workspace cloud orchestrator server 158 in an embodiment.

As described herein, the peripheral device workspace cloud orchestrator server 158 includes a computer-readable program code of a peripheral device workspace cloud manageability orchestrator module 165 that, when executed by the cloud orchestrator hardware processing device 170 of the peripheral device workspace cloud orchestrator server 158, uses device enrollment data describing one or more node devices in a manifest of node devices at an identified location to create a peripheral device workspace having a peripheral device workspace identification value stored at a database accessible to the peripheral device workspace cloud orchestrator server 158 with the one or more node devices forming part of the peripheral device workspace. In an embodiment, the individual nodes within this peripheral device workspace may form part of a collaborative peripheral device workspace and may be identified as such via execution of the collaborative workspace orchestrator module 166 as described herein. In the context of the present specification and in the appended claims, a peripheral device workspace may be an ecosystem of node devices (e.g., including a location identifier and peripheral devices coupled to the information handling system 100, a docking station 151, etc.) connected to a primary or anchor node device such as the information handling system 100. In an embodiment, a peripheral device workspace may also be defined with a peripheral device workspace identification value and part of a user composite peripheral device workspace identifier and a type-classification for the type of peripheral device workspace associated with each of the information handling system 100 and peripheral devices (e.g., input/output devices 142) such that a user may have multiple peripheral device workspaces having peripheral device workspace identification values associated with the user based on the context and/or environment of each identified peripheral device workspace. For example, a user composite peripheral device workspace identifier may be used to define a first peripheral device workspace at a home office having a first peripheral device workspace identification value, a second peripheral device workspace at a work office having a second peripheral device workspace identification value, a third peripheral device workspace at a different location (e.g., a coffee shop) having a third peripheral device workspace identification value, and other peripheral device workspaces that can be defined by both the node devices included within the peripheral device workspace and the location identifier of the physical location for the peripheral device workspace (e.g., defined by location data such as GPS data as well as network data) and having a having a peripheral device workspace identification value. Included may be one or peripheral device collaborative workspaces with a collaborative peripheral device workspace type identifier associated with its peripheral device workspace identification value in embodiments herein.

In the present specification and in the appended claims, a collaborative peripheral device workspace may be formed according to embodiments herein. A collaborative peripheral device workspace is any peripheral device workspace that facilitates the capability of more than one user to be active within the collaborative peripheral device workspace. An example, of a collaborative peripheral device workspace may be a conference room peripheral device workspace that might include one or more collaborative peripheral device nodes such as a central monitor, a common microphone, networking capabilities, as well as various input devices that allow one or more users to interact with graphical user interfaces (GUIs) presented on the central monitor. In order to further facilitate the collaborative nature of the collaborative peripheral device workspace, other portions of the peripheral device workspace may be operatively coupled to the conference room peripheral device collaborative workspace such that a user's anchor information handling system node may be included within this collaborative peripheral device workspace as well as those peripheral device nodes associated only with a given user's anchor information handling system node.

In an embodiment, each of the nodes within the collaborative peripheral device workspace may execute a collaborative workspace orchestrator sub-agent 172 by a respective hardware processing device. For example, the anchor information handling system 100 may execute computer-readable program code of a collaborative workspace orchestrator sub-agent 172 to register the anchor information handling system 100 and each peripheral device nodes operatively coupled to the anchor information handling system 100. This registration process may include the anchor information handling system 100 gathering identification data related to each node such as manufacturer, device identification (ID), model number, type classification of the peripheral device, and other identification and feature or operational data that allows the peripheral device workspace cloud orchestrator server 158 to generate a manifest of devices that describe the relationship between the anchor information handling system 100 and peripheral device nodes. In an embodiment, execution of the collaborative workspace orchestrator module 166 causes a peripheral device workspace to be formed based on data from the manifest and a location identifier for the peripheral device workspace. Still further, the execution of the computer-readable code of the collaborative workspace orchestrator module 166 causes a peripheral device workspace identification value to be associated with the created peripheral device workspace and have the manifest and associated peripheral device workspace identification value stored on a mesh manager database 173 or other database accessible by the peripheral device workspace cloud orchestrator server 158. Although this creation of a peripheral device workspace by the peripheral device workspace cloud orchestrator server 158 is completed, the present specification contemplates that at least one node within this peripheral device workspace may be a collaborative peripheral device node that forms part of a collaborative peripheral device workspace when that collaborative node within this peripheral device workspace is attempting to be operatively coupled to an anchor node (e.g., the anchor information handling system 100) within a created collaborative peripheral device workspace.

The hardware processor 102 of the anchor information handling system 100 may also execute computer-readable program code of an endpoint manageability sub-agent 178 to gather and send operational capabilities and settings associated with any node within the created peripheral device workspace, including a collaborative peripheral device workspace. These capabilities and settings for peripheral device nodes or other nodes may include, for example, device descriptions, audio capabilities, video capabilities, processing resources, storage device resources, wireless connection capabilities, wired connection connectors or capabilities, input capabilities, output capabilities, sampling rates, current and available audio settings, current and available video settings, current and available input settings, current and available output settings, and the like. These capabilities and settings may be used, for example, to determine which nodes within the peripheral device workspace should be included within a collaborative peripheral device workspace later when the anchor information handling system node 100 is requesting to join a collaborative peripheral device workspace.

In an embodiment, the cloud orchestrator hardware processing device 170 of the peripheral device workspace cloud orchestrator server 158 may execute computer-readable program code of the mesh manager module 168 to identify a mesh to be created within a collaborative peripheral device workspace, create that mesh with a mesh manifest of peripheral device nodes and other nodes in the mesh identified, and assign a mesh ID to that created mesh. In an embodiment, the peripheral device workspace cloud orchestrator server 158 may receive a request from the anchor information handling system node 100 to create a new mesh within the collaborative peripheral device workspace that may partition one or more peripheral device nodes in the peripheral device collaborative workspace into mesh manifests as well as identify shared collaboratively peripheral device nodes therein in embodiments herein. The anchor information handling system node 100 may send, via execution of the endpoint manageability sub-agent 178, key performance indicators (KPIs) to the peripheral device workspace cloud orchestrator server 158. These KPIs may include, in some embodiments, processing performance KPI, battery availability KPI, audio KPIs, video KPIs, application data such as calendar data, and the like for assessment of function or suitability within these meshes.

In an example embodiment where the collaborative peripheral device workspace includes a conference room workspace, some of the peripheral devices already present in the peripheral device workspace requesting to join the collaborative peripheral device workspace may not be needed, may not be suitable, and/or may not function within the collaborative peripheral device workspace for one or more particular user's anchor information handling system nodes. For example, a user's anchor information handling system node 100 may include a wireless mouse that may be used to manipulate objects presented on a video display device within the collaborative peripheral device workspace. However, where the received KPIs from the user's anchor information handling system node 100 within the joining peripheral device workspace indicate that the wireless mouse does not have sufficient battery capacity to operate for an entire length of a scheduled videoconferencing session or that another pointing or cursor device is available, the mesh created may not include the wireless mouse and instead the user may be required to operate a built-in trackpad associated with the anchor information handling system node 100 or another pointing or cursor control peripheral device. In an embodiment, after the mesh manager module 168 has created the mesh that includes the user's anchor information handling system node 100 and appropriate peripheral devices based on the received KPIs, the mesh ID may be sent back to the anchor information handling system node 100 along with a profile of the mesh which may indicate to the user which peripheral devices are included within the created mesh, including collaborative peripheral device nodes, and are available to the user to collaborate with other users within the collaborative peripheral device workspace. This process allows for seamless and secure onboarding to a collaborative peripheral device workspace by providing adaptive mesh management within that collaborative peripheral device workspace.

It is appreciated that, in some embodiments, as parameters, characteristics, and/or KPIs associated with any peripheral device within the created mesh by the mesh manager module 168 change, any affected peripheral device may be removed from the mesh. For example, where a smart device within the mesh such as a docking station indicates that a thermal threshold has been exceeded, the docking station may be removed from or disabled within the created mesh. The removal of the peripheral device or disabling may be reflected in the mesh manager database 173 by the mesh manager module 168 and the manifest of the mesh is updated accordingly. The removal or disabling of the peripheral device, in an example embodiment, may be done so that the user experience is not hindered or reduced thereby maintaining a level of quality of experience (QoE) for the user while the anchor information handling system node 100 is being used by the user to collaborate with other users within the collaborative peripheral device workspace. It is appreciated that certain policies may also be set such that violation of these policies also removes the policy-violating peripheral devices from identification within the mesh. For example, a policy may be set for the mesh to not be allowed to provide audio input during, for example, a videoconference session. Where the user turns on the microphone to provide audio input, the violation of this policy causes the mesh manager module 168 to remove or disable the microphone from the mesh, update the created mesh within the mesh manager database 173, and notify the user via a video display device of the anchor information handling system node 100 that the microphone has been removed or disabled from the mesh and audio input is no longer available via the microphone.

In an embodiment, the peripheral device workspace cloud orchestrator 156 with the peripheral device workspace cloud orchestrator server 158 may be operatively coupled to a third-party manageability platform 176. A third-party manageability platform 176 may include any endpoint management service such as Microsoft® Intune® that is used to help manage the remote workspaces. The use of the third-party manageability platforms 176 allows, for example, an ITDM to help create the peripheral device workspaces, create the collaborative peripheral device workspaces, define the collaborative peripheral device workspaces, register peripheral devices (e.g., node devices) with the peripheral device workspace cloud orchestrator server 158, and modify created collaborative peripheral device workspaces each having peripheral device workspace identification values based on detected changes (e.g., inclusion of new node devices, removal of node devices, and swapping of node devices within the workspace, etc.) within any given peripheral device workspace. The third-party manageability platform 176 may communicate with an endpoint manageability sub-agent 178 being executed by the hardware processor 102 of the anchor information handling system node 100 in order to determine which peripheral devices are being used on the anchor information handling system node 100 as well as any settings, parameters, and/or characteristics of each of the peripheral devices associated with the peripheral device workspace cloud orchestrator 156 and being onboarded to the collaborative peripheral device workspace. It is appreciated that any number of third-party manageability platforms 176 operatively coupled to the peripheral device workspace cloud orchestrator server 158 within the peripheral device workspace cloud orchestrator 156 may be used to allow the ITDM to perform those actions as described herein. The peripheral device workspace cloud orchestrator server 158 may, therefore, act as a central location where an ITDM may, via the peripheral device workspace cloud orchestrator console 160, access data describing each created peripheral device workspace, make changes to the peripheral device workspaces, and submit hardware device operational policies to be applied to any of the node devices within each peripheral device workspace as well as conduct software/firmware updates for all necessary node devices with the execution of the third-party manageability platform 176 within the peripheral device workspace cloud orchestrator 156.

When referred to as a "system," a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include hardware processing resources executing software, including firmware embedded at a device, such as an Intel® brand processor, AMD® brand processors, Qualcomm® brand processors, or other processors and chipsets, or other such hardware device capable of operating a relevant software environment of the information handling system. The system, device, controller, or module can also include a combination of the foregoing examples of hardware or hardware executing software or firmware. Note that an information handling system can include an integrated circuit or a board-level product having portions thereof that can also be any combination of hardware and hardware executing software. Devices, modules, hardware resources, or hardware controllers that are in communication with one another need not be in continuous communication with each other, unless expressly specified otherwise. In addition, devices, modules, hardware resources, and hardware controllers that are in communication with one another can communicate directly or indirectly through one or more intermediaries.

Figure 2:
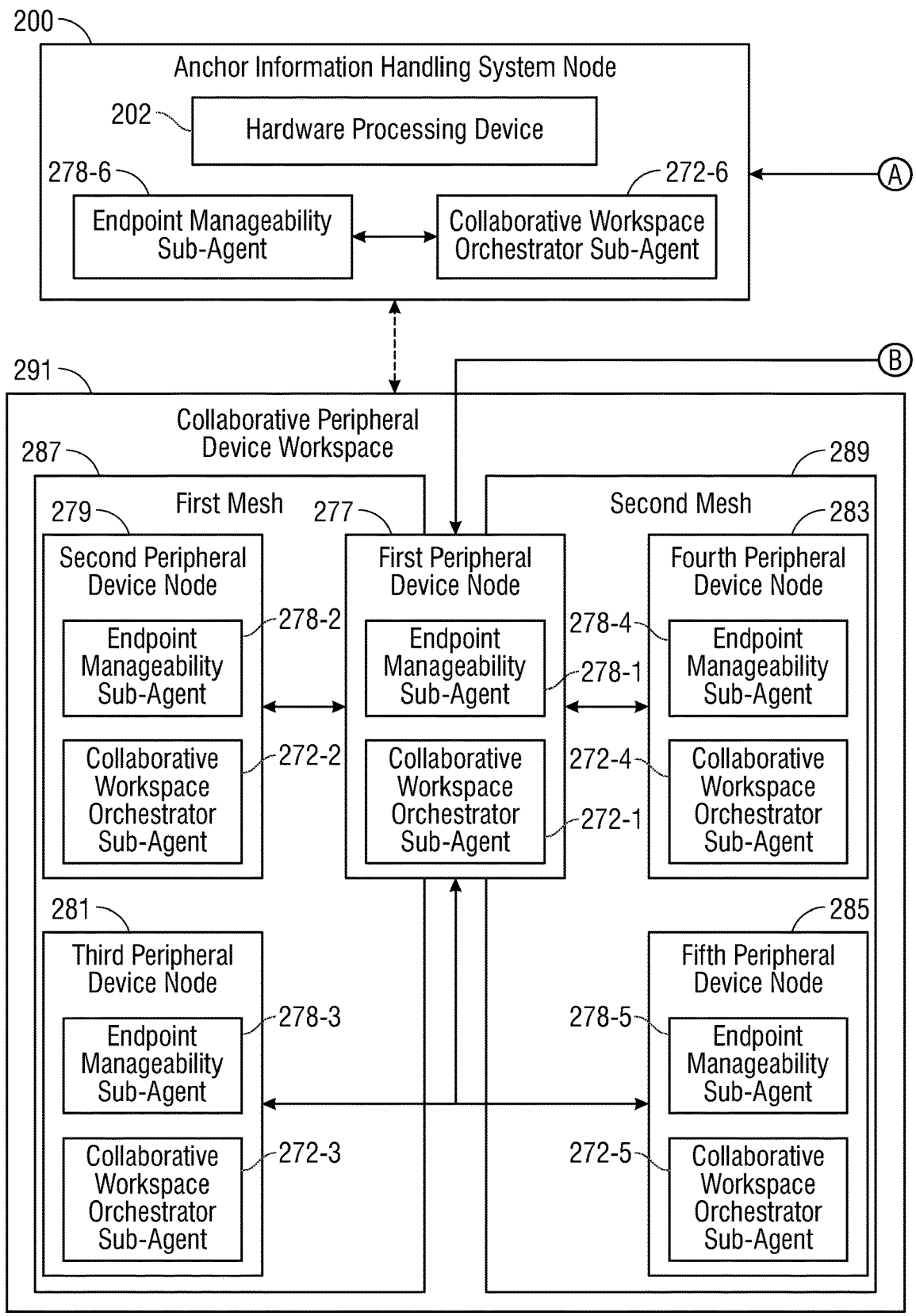
FIG. 2 is a graphic diagram of a collaborative peripheral device workspace with plural meshes operatively coupled to a peripheral device workspace cloud orchestrator server according to another embodiment of the present disclosure.
Figure 2:
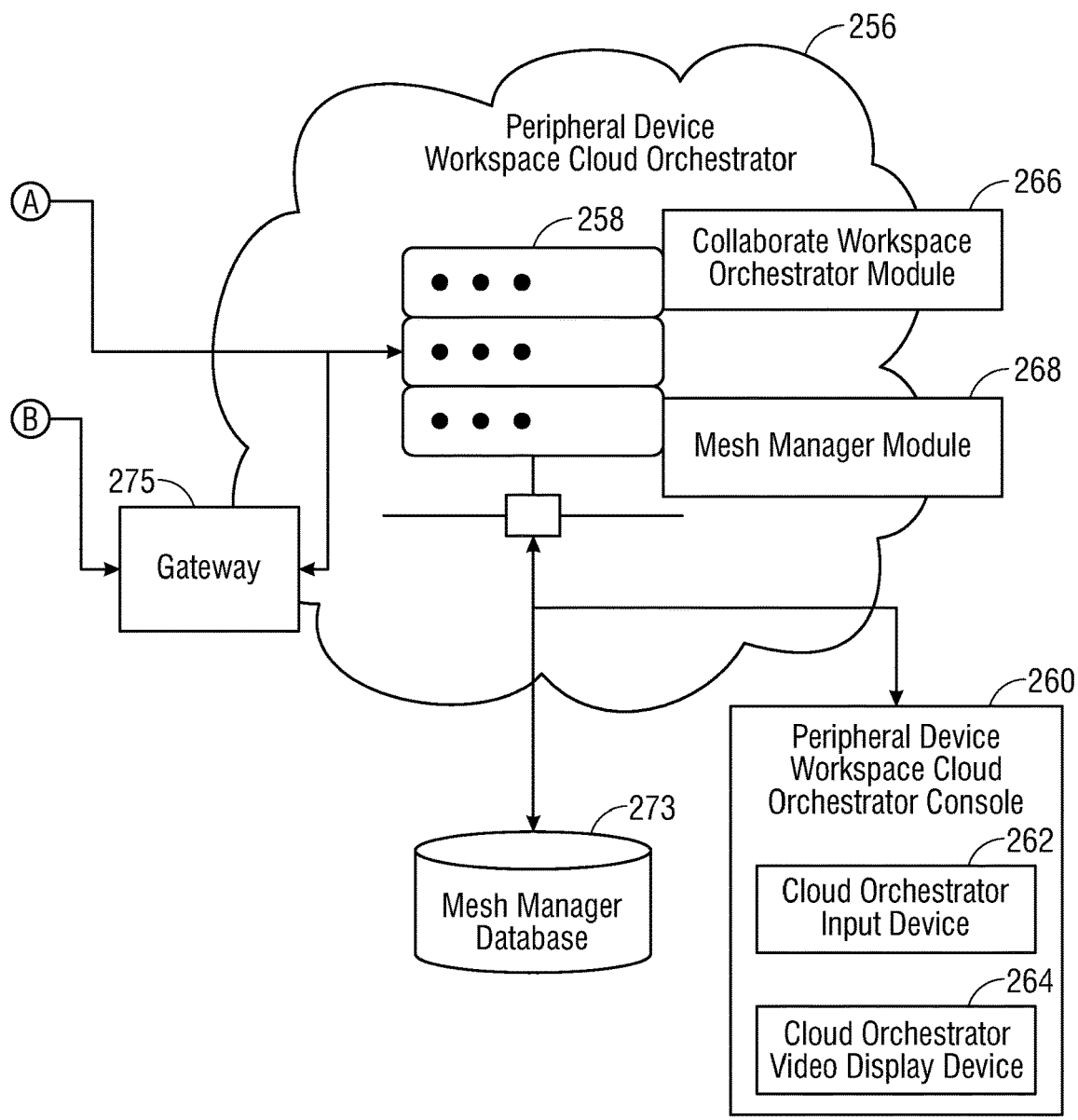

FIG. 2 is a graphic diagram of a collaborative peripheral device workspace 291 operatively coupled to a peripheral device workspace cloud orchestrator server 258 according to another embodiment of the present disclosure. As described in embodiments herein, the anchor information handling system node 200 may be onboarded onto an existing collaborative peripheral device workspace 291 that allows the user of the anchor information handling system node 200 to engage within an ecosystem of nodes that allow a plurality of users to be active at any given time. This collaborative peripheral device workspace 291 may be, for example, a conference room collaborative peripheral device workspace 291 where multiple users may onboard their respective anchor information handling system nodes 200 as well as some or all of their associated peripheral device nodes into the collaborative peripheral device workspace 291. In the embodiment shown in FIG. 2, the collaborative peripheral device workspace 291 includes a first mesh 287 and a second mesh 289 each with a mesh manifest of peripheral device nodes and other nodes in each mesh. A first peripheral device node 277 may be part of either or both the first mesh 287 and second mesh 289 and may include, for example, a collaborative peripheral device node 277 that may be a common video display device of a conference room collaborative peripheral device workspace in one embodiment. The first mesh 287 may include a second peripheral device node 279 and a third peripheral device node 281 in a first mesh manifest while the second mesh 289 includes a fourth peripheral device node 283 and fifth peripheral device node 285 in a second mesh manifest. The first collaborative peripheral device node 277 may appear in both the first mesh manifest and the second mesh manifest. The anchor information handling system node 200, may enter and register with the collaborative peripheral device workspace 291 and operate as a potential sixth peripheral device workspace node to be onboarded using the systems and methods described herein. Plural anchor information handling systems 200 of plural users may enter and be registered with the collaborative peripheral device workspace 291 and operate as additional potential peripheral device workspace nodes to be onboarded using the systems and methods described herein. In some embodiments, each anchor information handling system 200 may operate within its own mesh 287 or 289. In other embodiments, anchor information handling systems 200 may operate in plural meshes 287 and 289.

As described herein, the anchor information handling system node 200 is operatively coupled to a peripheral device workspace cloud orchestrator 256 over a network that includes any number of servers, computing devices, and other cloud computing resources such as the peripheral device workspace cloud orchestrator server 258. The anchor information handling system node 200 may have access to the cloud orchestrator server 258 via a network interface device. In an embodiment, the anchor information handling system node 200 may be, initially, part of a peripheral device workspace with the anchor information handling system node 200 associated with a plurality of peripheral devices that may include, for example, one or more video display devices, an external keyboard, a built-in keyboard, a mouse (wired or wireless), a built-in webcam, a wired or wireless webcam, a printer, a speaker, a fingerprint scanner, a built-in trackpad, and a stylus, among other peripheral devices that may be integrated peripheral devices in the anchor information handling system node 200 (e.g., a laptop) or separate, external peripheral device nodes. The collaborative peripheral device workspace 291 that includes the anchor information handling system node 200 and its peripheral devices may be associated with a peripheral device workspace identification value and a manifest describing the peripheral devices in the peripheral device workspace and its associated peripheral device workspace identification value may be saved on a database associated with the cloud orchestrator server 258. Similarly, a manifest of a subset of peripheral device nodes, collaborative peripheral device nodes, and any associated anchor nodes may be defined for each mesh 287 and 289 within the collaborative peripheral device workspace 291 in embodiments herein.

The peripheral device workspace cloud orchestrator 256 may include any hardware that may be distributed over multiple physical locations but act in concert with each other and specifically the peripheral device workspace cloud orchestrator server 258 to facilitate, for example, an ITDM to, via hardware device operational policies, cause a collaborative peripheral device workspace to be created that includes any number of node devices (e.g., including the anchor information handling system node 200) forming part of the collaborative peripheral device workspace after receiving device enrollment data describing one or more node devices. It is appreciated that the collaborative peripheral device workspace 291 may include any number of node devices and which may include some or all of those node devices that form any mesh 287 or 289 within an individual peripheral device collaborative workspace 291. Some peripheral device node device nodes may be brought into the peripheral device workspace 291 that otherwise exist outside of a collaborative peripheral device workspace 291 scenario in some embodiments. In an embodiment, the ITDM may also create hardware device operational policies that, based on the registered node devices detected within the one or more created collaborative peripheral device workspaces 291, facilitate the operations of the various nodes within the collaborative peripheral device workspace 291, including any collaborative peripheral device nodes, such as first peripheral device node 277, in the meshes 287 and 289. In an embodiment, the ITDM may cause hardware device operational policies to be applied to the created collaborative peripheral device workspace 291. It is appreciated that the node devices described herein may include each of the peripheral devices operatively coupled to any anchor information handling system node 200 acting as a primary or anchor information handling system node and from either mesh 287 or 289 in various embodiments herein.

The peripheral device workspace cloud orchestrator server 258 may be any computing device that may include similar elements as the anchor information handling system node 200 such as a memory device, a cloud orchestrator hardware processing device 270, a PMU, and other elements that allow the peripheral device workspace cloud orchestrator server 258 to execute computer-readable program code of the collaborative workspace orchestrator module 266 and mesh manager module 268 and other software as described herein.

In an embodiment, the peripheral device workspace cloud orchestrator server 258 may be operatively coupled to a peripheral device workspace cloud orchestrator console 260. The peripheral device workspace cloud orchestrator console 260 may be used by the ITDM to create and propagate hardware device operational policies, track a lifecycle of ordered node devices, monitor for compliant and non-compliant node devices within a peripheral device workspace, propagate optimal settings for any give node device or types of node devices, monitor and provide recommended software/firmware updates to node devices, remediate software/firmware issues among the plurality of node devices, manage collaborative peripheral device workspace sessions (e.g., associate a user's identification with a peripheral device workspace), enable automatic security updates for node devices within the collaborative peripheral device workspaces, manage auto-pairing of node devices to other node devices within the collaborative peripheral device workspace, and troubleshoot and remediate node deceives from the cloud orchestrator console 260. It is appreciated that the peripheral device workspace cloud orchestrator console 260 may include a cloud orchestrator input device 262 and a cloud orchestrator video display device 264 that allows the ITDM to complete these processes and engage with the peripheral device workspace cloud orchestrator server 258 in an embodiment.

As described herein, the peripheral device workspace cloud orchestrator server 258 includes a computer-readable program code of a peripheral device workspace cloud manageability orchestrator module 265 that, when executed by the cloud orchestrator hardware processing device 270 of the peripheral device workspace cloud orchestrator server 258, uses device enrollment data describing one or more node devices at a physical or WLAN or WWAN location having a location identifier to create a collaborative peripheral device workspace 291 with the one or more node devices forming part of the collaborative peripheral device workspace 291. In an embodiment, the individual nodes within this collaborative peripheral device workspace 291 may be identified as such with a peripheral device node identification such as a serial number and an orchestrated device descriptor (ODD) value providing features, configurations, and other environmental context data for the peripheral device node via execution of the collaborative workspace orchestrator module 266 as described herein. In an embodiment, a collaborative peripheral device workspace 291 may also be defined with a collaborative peripheral device workspace identification value such that an enterprise may have multiple collaborative peripheral device workspace 291 having collaborative peripheral device workspace identification values associated with locations and manifests of peripheral device nodes at such locations within the enterprise and including environmental context data such as configuration and connectivity environment information of each identified collaborative peripheral device workspace 291. For example, an peripheral device workspace identification value may be used to define a first collaborative peripheral device workspace 291 at a first conference room location having a first collaborative peripheral device workspace identification value, a second collaborative peripheral device workspace at a work office location having a second collaborative peripheral device workspace identification value, and other collaborative peripheral device workspaces 291 that can be defined by both the node devices included within the collaborative peripheral device workspace 291 and the location of the collaborative peripheral device workspace 291 (e.g., defined by location data such as GPS data as well as network location data) with manifests of peripheral device nodes and other nodes at those locations and having a peripheral device workspace identification value associated thereto.

An example, of a collaborative peripheral device workspace 291, for purposes of explanation, may be a conference room peripheral device workspace that includes a central monitor, a common microphone, networking capabilities, as well as various input devices that allow one or more users to interact with graphical user interfaces (GUIs) presented on a collaborative peripheral device node, such as first peripheral device node 277, that may be the central monitor. In order to further facilitate the collaborative nature of the collaborative peripheral device workspace 291, the collaborative peripheral device workspace may be partitioned into meshes 287 and 289 such that the meshes 287 and 289 of the collaborative peripheral device workspace 291 includes one or more anchor information handling system nodes 200 each that may be operatively coupled to the collaborative peripheral device node or first peripheral device node 277 in the conference room collaborative peripheral device workspace 291. A user's anchor information handling system node 200 may be included within this collaborative peripheral device workspace 291 for a mesh 287 or 289 as well as those peripheral device nodes 279, 281 or 283, 285 associated with the user's anchor information handling system node 200 in a mesh 287 or 289. This onboarding of the user's anchor information handling system node 200 into the collaborative peripheral device workspace 291 and a mesh 287 or 289 allows that user to actively engage in the activities associated with the collaborative peripheral device workspace 291 such as a videoconferencing session that allows each user to provide input at first, collaborative peripheral device node 277, such as the central video display device, as well as separate peripheral device nodes 279, 281 or 283, 285 in mesh 287 or 289 in order to allow multiple users to collaborate with each other.

In an embodiment, each of the nodes 277, 279, 281, 283, 285, or 200 within the collaborative peripheral device workspace 291 may execute a collaborative workspace orchestrator sub-agent 272-1, 272-2, 272-3, 272-4, 272-5, 272-6 by a respective hardware processing device, if there is processing capability. If not, the anchor information handling system node 200 for either mesh 287, 289 may execute the collaborative workspace orchestrator sub-agent 272-6 on behalf of a peripheral device node 277, 279, 281, 283, 285. For example, the anchor information handling system 200 may execute computer-readable program code of a collaborative workspace orchestrator sub-agent 272-6 to register the anchor information handling system 200 and each of the peripheral device nodes operatively coupled to the anchor information handling system 200 in a mesh 287, 289 within the collaborative peripheral device workspace 291 with the cloud orchestrator server 258 in order to be onboarded into the collaborative peripheral device workspace 291. This registration process may include the anchor information handling system 200 gathering identification data related to each node such as manufacturer, peripheral device identification (ID) such as a serial number, model number, a peripheral device type or node type classification, and other identification data that allows the peripheral device workspace cloud orchestrator server 258 to generate a manifest of peripheral devices that describe the relationship between the anchor information handling system 200 and its associated peripheral device nodes. In an embodiment, execution of the computer-readable program code of the collaborative workspace orchestrator module 266 at the cloud orchestrator server 258 via a hardware processor causes a collaborative peripheral device workspace 291 to be formed based on data from the manifest at a location having a location identifier. Still further, the execution of the computer-readable code of the collaborative workspace orchestrator module 266 causes a collaborative peripheral device workspace identification value to be associated with the created collaborative peripheral device workspace 291 and parsed into one or more meshes 287 and 289 with the manifest of nodes, location, and associated peripheral device workspace identification value and mesh IDs stored on a mesh manager database 273. Although this creation of a collaborative peripheral device workspace 291 by the peripheral device workspace cloud orchestrator server 258 is completed, the present specification contemplates that at least one node within this peripheral device workspace may be a collaborative peripheral device node, such as the first peripheral device node 277, that forms part of a collaborative peripheral device workspace 291 when an anchor node within a peripheral device workspace (e.g., the anchor information handling system 200) is attempting to be operatively coupled to a collaborative node and other nodes within a mesh 287 or 289 within a created collaborative peripheral device workspace 291.

The hardware processor 202 of the anchor information handling system 200 may also execute computer-readable program code of an endpoint manageability sub-agent 278-6 to gather and send operational capabilities and settings associated with the anchor node information handling system 200 and any other node 277, 279, and 281 within mesh 286 or 277, 283, and 285 within mesh 289 in the created collaborative peripheral device workspace 291. These capabilities and settings may include, for example, device descriptions, audio capabilities, video capabilities, processing resources, storage device resources, wireless connection capabilities, input capabilities, output capabilities, current and available configurations and settings such as for connectivity, current and available audio settings, current and available video settings, current and available input settings, current and available output settings, and the like. These capabilities and settings may be used, for example, to determine which nodes associated with an onboarding anchor information handling system node 200 should be included within a collaborative peripheral device workspace 291 and a mesh 287, 289 therein as the anchor information handling system node 200 is requesting to join a collaborative peripheral device workspace 291 and either mesh 287 or 289.

In an embodiment, the cloud orchestrator hardware processing device of the peripheral device workspace cloud orchestrator server 258 may execute computer-readable program code of the mesh manager module 268 to identify a mesh 287 or 289 to be created within a collaborative peripheral device workspace 291 that includes one or more collaborative peripheral device nodes (e.g., first peripheral device node 277) and additional peripheral device nodes 279, 281 or 283, 285 also associated with that mesh 287 or 289, create that mesh, and assign a mesh ID to that created mesh and associate it with the collaborative peripheral device workspace identification value for the collaborative peripheral device workspace 291. In the present specification and in the appended claims, a mesh 287 or 289 may include a collection of nodes 279, 281, and 277 or 283, 285, and 277 placed within a logical group, including an anchor information handling system node 200 or other smart node that has networking capabilities and can access the services provided by the cloud orchestrator server 258. This logical grouping may be, as described herein, based on the detected KPIs and association of individual nodes with an anchor information handling system node 200 or other smart device node such as within the collaborative peripheral device workspace 291, such as a conference room example, that also includes the collaborative first peripheral device node 277, such as the central monitor or the common microphone that may be used by plural users. In an embodiment, the peripheral device workspace cloud orchestrator server 258 may receive a request from the anchor information handling system node 200 to create a new mesh 287 or 289 within the collaborative peripheral device workspace 291. The anchor information handling system node 200 may send, via execution of the endpoint manageability sub-agent 278, a manifest of nodes to be included in the new mesh 287 or 289 as well as KPIs for the manifest of mesh nodes and other environmental data to the peripheral device workspace cloud orchestrator server 258. These KPIs may include, in some embodiments, processing performance KPI, battery availability KPI, audio KPIs, video KPIs, thermal performance KPIs, application data such as calendar data, and the like for assessment of function or suitability within any created mesh 287, 289. In an example embodiment where the collaborative peripheral device workspace 291 includes a conference room workspace, some of the peripheral devices already present in the peripheral device workspace (e.g., the anchor information handling system node 200 and its associated peripheral devices 279, 281 or 283, 285) requesting to join the collaborative peripheral device workspace 291 may not be needed, may not be suitable, and/or may not function within the collaborative peripheral device workspace 291. For example, a user's anchor information handling system node 200 may include a wireless mouse that may be used to manipulate objects presented on the common video display device within the collaborative peripheral device workspace. However, where the received KPIs from the user's anchor information handling system node 200 within the joining peripheral device workspace indicate that the wireless mouse does not have sufficient battery capacity to operate for an entire length of a scheduled videoconferencing session, the mesh created may not include the wireless mouse and instead the user may be required to operate a built-in trackpad associated with the anchor information handling system node 200 as part of the mesh in order to provide input within the collaborative peripheral device workspace 291 in one example embodiment.

In other embodiments, plural user's anchor information handling system nodes 200 may request formation of a mesh 287 that includes a subset of a second peripheral device node 279 and a third peripheral device node 281 for a first user's anchor information handling system node 200 to form a mesh 287 including a collaborative first peripheral device node 277. Additionally, a second user's anchor information handling system node (not shown) may also enter the collaboratively peripheral device workspace 291 to for a mesh 289 with a subset of a fourth peripheral device node 283 and a fifth peripheral device node 285 for a second user's anchor information handling system node in mesh 289 that also includes collaborative first peripheral device node 277 in embodiments herein. In this case, each of a plurality of meshes 287 and 289 may be logically separated among concurrent users within a collaborative peripheral device workspace 291 for coordination of use and configuration of a collaborative first peripheral device node 277 as well as distinct management of use and configuration of separate peripheral device nodes 279, 281 and 283, 285 for particular users of first and second anchor information handling system nodes 200. Management of configurations and settings, as well as operating policy implementation may thus be automatically coordinated more accurately within a collaborative peripheral device workspace 291 with the formation of plural meshes 287 and 289 according to embodiments herein.

In an embodiment, after the mesh manager module 268 has created the mesh that includes the user's anchor information handling system node 200 and appropriate peripheral devices 279, 281, and 277 or 283, 285, and 277 based on the received KPIs, a mesh ID associated with the created mesh 287 or 289 may be sent back to the anchor information handling system node 200 along with a profile of the mesh which may indicate to the user which peripheral devices are included within the created mesh and are available to the user to collaborate with other users within the collaborative peripheral device workspace 291 who may operate in other meshes. Furthermore, the mesh ID as well as a mesh manifest of node devices within the created mesh and an owner associated with the mesh (e.g., a user of the anchor information handling system node 200 or a smart node that may be associated with a mesh) may be stored or updated on the mesh manager database 273. This process allows for seamless and secure onboarding to a collaborative peripheral device workspace 291 by providing adaptive mesh management within that collaborative peripheral device workspace 291 for one or more meshes 287, 289 and coordination among a plurality of user's anchor information handling system nodes 200 and users with one or more collaborative first peripheral device nodes 277 as well as separate mesh nodes.

It is appreciated that, in some embodiments, as parameters, characteristics, and/or KPIs associated with any peripheral device within the created mesh by the mesh manager module 268 change, any affected peripheral device may be removed from the mesh in some embodiments. For example, where a smart device within the mesh, such as a docking station operatively coupled to the anchor information handling system node 200, indicates that a thermal threshold has been exceeded, the docking station may be removed from within the created mesh. The removal of the peripheral device may be reflected in the mesh manager database 273 by the mesh manager module 268 and the manifest of the mesh stored thereon is updated accordingly. In other embodiments, it is appreciated that parameters, characteristics, and/or KPIs associated with any peripheral device node within the collaborative peripheral device workspace 291 may be compatible or better suited for some anchor information handling system nodes or their users than others. Thus, a peripheral device node within the created mesh by the mesh manager module 268 may be changed from one mesh 287 to a second mesh 289 such that any affected peripheral device may be removed from the mesh in some embodiments and added to a different mesh or not used at all depending on compatibility or suitability for use with an anchor information handling system node 200 entering the collaborative peripheral device workspace 291. The removal or addition of the peripheral device, in an example embodiment, may be done so that the user experience is not hindered or reduced thereby maintaining a level of QoE for the user while the anchor information handling system node 200 is being used by the user to collaborate with other users within the collaborative peripheral device workspace 291. It is further appreciated that certain policies may also be set such that violation of these policies also removes the policy-violating peripheral devices from the mesh or swaps or replaces peripheral device nodes within or among meshes in the collaborative peripheral device workspace 291. For example, a policy may be set for those peripheral devices within the mesh to not be allowed to provide audio input during, for example, a videoconference session. Where the user turns on the microphone (built-in or associated with an external webcam, for example) to provide audio input, the violation of this policy causes the mesh manager module 268 to remove the microphone from the mesh, update the created mesh within the mesh manager database 273, and notify the user via a video display device of the anchor information handling system node 200 that the microphone has been removed from the mesh and audio input is no longer available via the microphone.

In an embodiment, the interface between the anchor information handling system node 200, the collaborative peripheral device workspace 291, and the cloud orchestrator server 258 may include a gateway 275. The gateway 275 may serve to adapt any mesh association by collecting regular status details of each device node 279, 281 or 283, 285 of either mesh 287 or 289 and collaborative first peripheral device node 277 within the collaborative peripheral device workspace 291 as well as gather the KPI data as telemetry for the cloud orchestrator server 258 to use to adapt those meshes formed within the collaborative peripheral device workspace 291 such as the first mesh 287 and second mesh 289. Based on changes to KPIs associated with individual device nodes, the mesh manager module 268 adds or removes individual peripheral device nodes or configures, coordinates operation, or implements operating policies of those peripheral device nodes as described herein.

Figure 3:
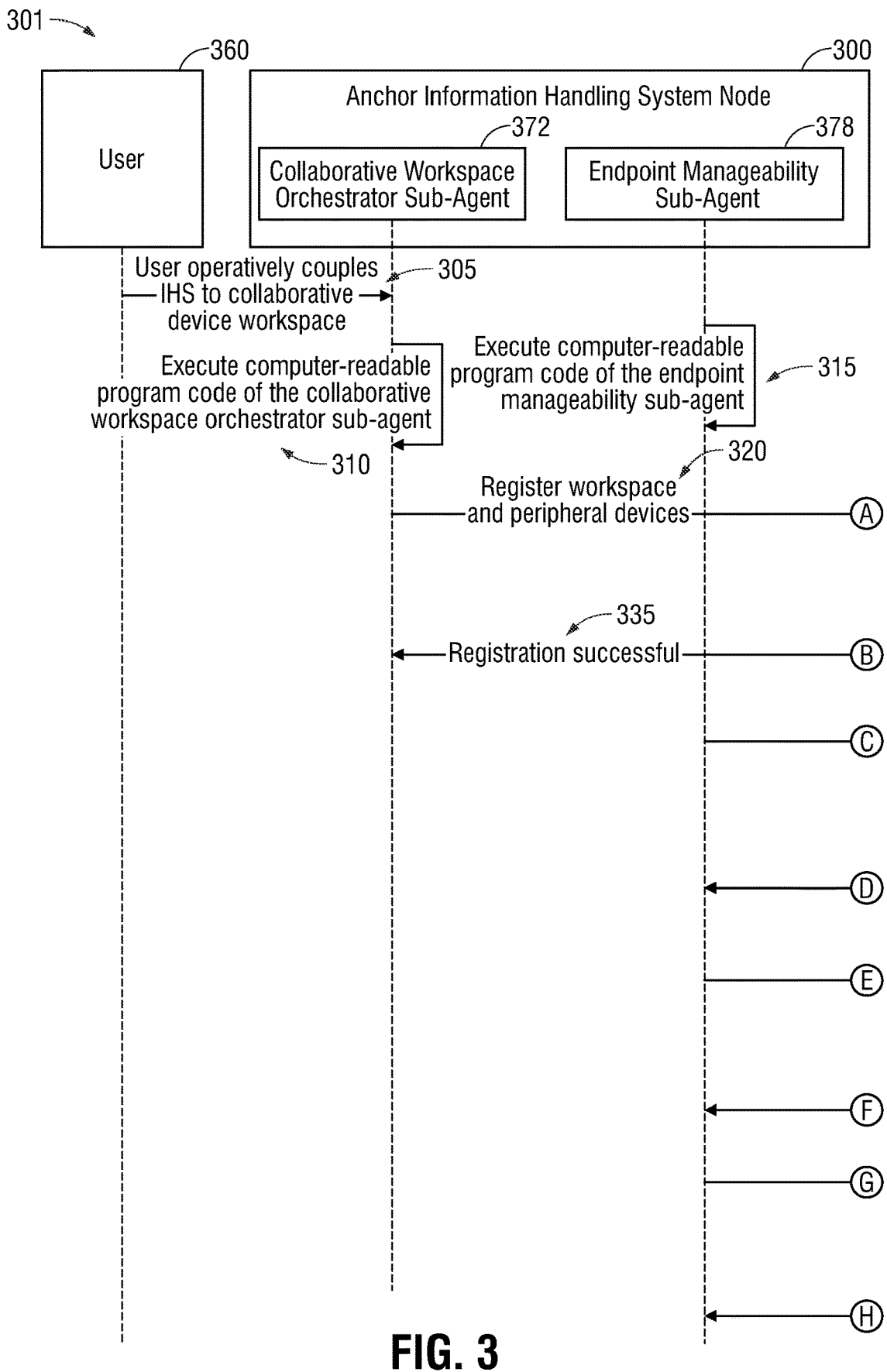
FIG. 3 is a flow chart showing a method of creating a mesh within a collaborative peripheral device workspace according to an embodiment of the present disclosure.
Figure 3:
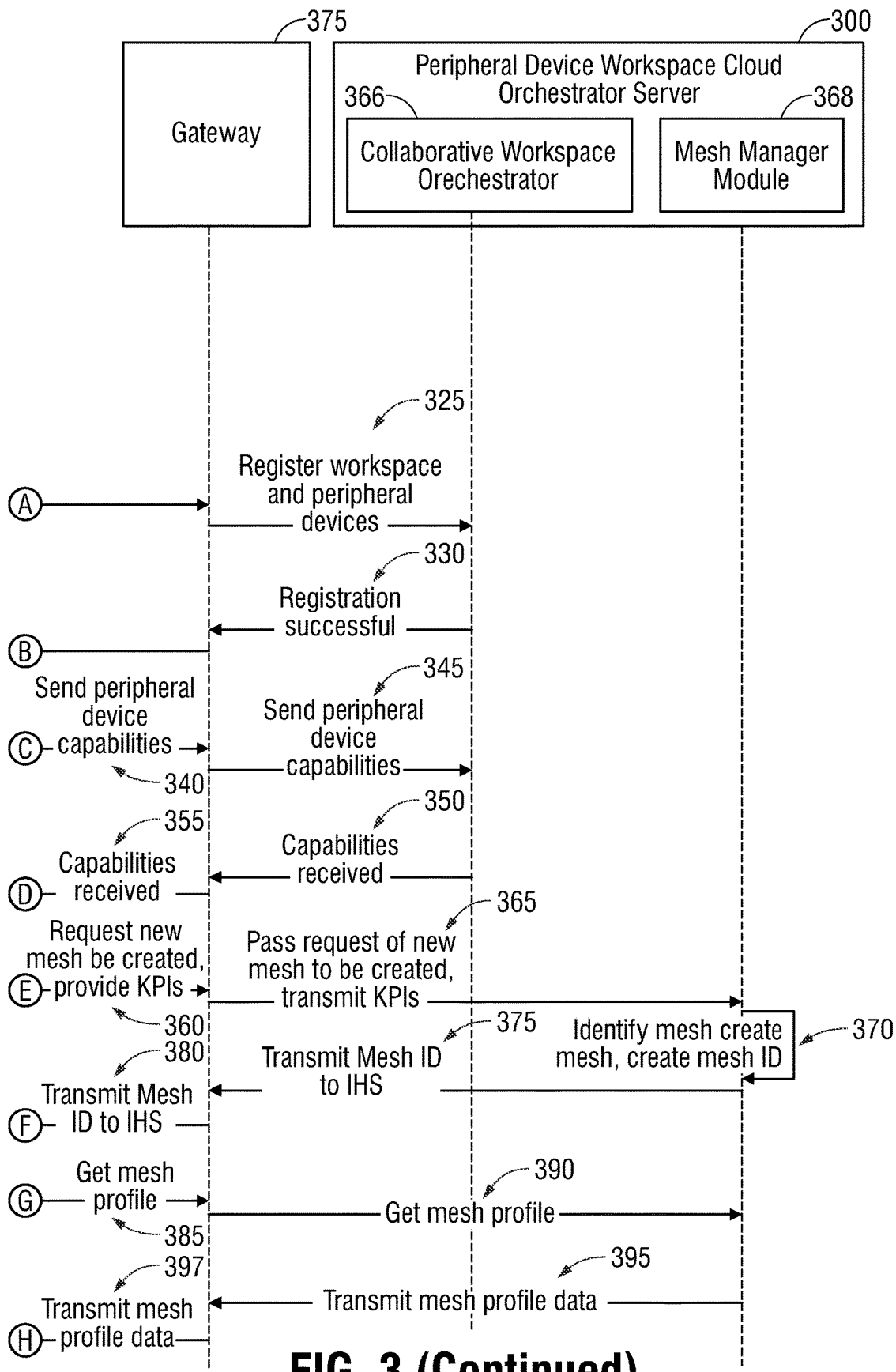

FIG. 3 is a flow chart showing a method 301 of creating a mesh within a collaborative peripheral device workspace according to an embodiment of the present disclosure. The method 301 describes the process of onboarding an anchor information handling system node 300 into a collaborative peripheral device workspace including the anchor information handling system node 300 and a subset associated peripheral devices, including one or more collaborative peripheral device nodes, at that collaborative peripheral device workspace into a collaborative workspace orchestrator module 366 executing at a peripheral device workspace cloud orchestrator server 300. The method 301 further describes forming a mesh describing the collection of peripheral device nodes and other nodes within a logical group of a mesh manifest for a user 391 in the collaborative peripheral device workspace with the mesh manager module 368. Collaborative peripheral device nodes may span plural meshes and appear in their mesh manifests within the peripheral device workspace.

The method 301 includes, at line 305, the user 391 of the anchor information handling system node 300 attempting to operatively couple the anchor information handling system node 300 to the collaborative peripheral device workspace. In an embodiment, this may include the user signing into a videoconferencing session or accessing a WLAN or other network at a conference room, for example, after the user has physically moved the anchor information handling system node 300 into the conference room where the conference room collaborative peripheral device workspace is located. At this point, a hardware processing device of the anchor information handling system node 300 may execute computer-readable program code of the collaborative workspace orchestrator sub-agent 372 at line 310. Additionally, the hardware processing device of the anchor information handling system node 300 may execute computer-readable program code of the endpoint manageability sub-agent 378 at line 315.

The execution of the computer-readable program code of the collaborative workspace orchestrator sub-agent 372 by the hardware processing device of the anchor information handling system node 300 causes the anchor information handling system node 300 to register with the collaborative peripheral device workspace and a set of peripheral devices therein associated with the anchor information handling system node 300 at line 320 with the collaborative workspace orchestrator module 366 executing on the peripheral device workspace cloud orchestrator server 300. In an example embodiment, the collaborative workspace orchestrator sub-agent 372 may send identification data associated with the anchor information handling system node 300 and its manifest of peripheral devices to the peripheral device workspace cloud orchestrator server 358 via the gateway 375 a lines 320 and 325. This may include a user composite peripheral device workspace identifier for the user 391 of the anchor information handling system 300 as well as orchestrated device descriptor information (ODD) for each of the peripheral device nodes in the collaborative peripheral device workspace to be associated with the anchor information handling system node 300 in some embodiments. Further, the collaborative peripheral device workspace is identified by a collaborative peripheral device workspace identifier value associated with the physical or network location of the conference room. This allows the collaborative workspace orchestrator module 366 to create a manifest of the anchor information handling system node 300 and its associated peripheral devices that describes the relationship between the anchor information handling system node 300 and those peripheral devices in the collaborative peripheral device workspace.

The successful registration of the anchor information handling system node 300 and its associated peripheral devices at lines 330 and 335 is provided via gateway 375 to the collaborative workspace orchestrator sub-agent 372 at the anchor information handling system 300. This successful registration causes the peripheral device workspace cloud orchestrator server 358 to store the manifest of the anchor information handling system node 300 and its associated peripheral devices on a workspace database with an assigned peripheral device workspace identification value to that registered collaborative peripheral device workspace. It is appreciated that as new peripheral devices are added to (e.g., along with the new anchor node information handling system 300) or existing peripheral devices are removed from the created collaborative peripheral device workspace, the manifest stored on the collaborative peripheral device workspace database may be updated. It is also appreciated that a collaborative peripheral device workspace is created with the anchor information handling system node 300 being one of many users' anchor information handling system nodes 300 included within the collaborative peripheral device workspace and registered with the peripheral device workspace cloud orchestrator server 358. The creation of a collaborative peripheral device workspace may also include the creation of a manifest listing those anchor information handling system nodes 300 and associated peripheral devices, including collaborative peripheral device nodes, within the manifest and the creation of the collaborative peripheral device workspace identification value to identify the particular collaborative peripheral device workspace. As described further below, plural users 391 with plural anchor information handling system nodes 300 within the collaborative peripheral device workspace may be further sorted and defined into meshes within the collaborative peripheral device workspace in embodiments herein.

At lines 340 and 345, the execution of the computer-readable program code of the endpoint manageability sub-agent 378 causes the anchor information handling system node 300 to gather and send peripheral device capabilities and settings for peripheral device nodes, including any collaborative peripheral device nodes, to the peripheral device workspace cloud orchestrator server 358 via the gateway 375 indicating the capabilities and settings of each associated peripheral device and other nodes in the collaborative peripheral device workspace. Again, these capabilities and settings may include, for example, device descriptions, audio capabilities, video capabilities, processing resources, storage device resources, wireless or wired connection capabilities, input capabilities, output capabilities, current and available audio settings, current and available video settings, current and available input settings, current and available output settings, sampling or polling rates, resolutions, and the like. In the context of a collaborative peripheral device workspace being created by the execution of the computer-readable program code of the collaborative workspace orchestrator module 366 by the hardware processing device of the peripheral device workspace cloud orchestrator server 358, these capabilities and settings allow the peripheral device workspace cloud orchestrator server 358 to later define which of the peripheral devices are to be included within a mesh, what settings are to be initiated, as well as which policies are to be followed by the peripheral devices within the mesh created and based on user composite peripheral device workspace identifier settings or preferences in various embodiments. At lines 350 and 355 a notification that the capabilities and settings have been received by the peripheral device workspace cloud orchestrator server 358 is provided to the anchor information handling system node 300 via gateway 375.

At lines 360 and 365, the anchor information handling system node 300 may also submit a request that a new mesh be created within the collaborative peripheral device workspace and that the KPIs associated with each device node within the collaborative peripheral device workspace or peripheral device workspace be sent to the peripheral device workspace cloud orchestrator server 358 via the gateway 375. A mesh may be created when, for example, plural users 391 with plural anchor information handling systems nodes 300 or smart nodes enter a collaborative peripheral device workspace such that ownership of plural peripheral device nodes is apportioned in mesh manifests of plural meshes as well as determination of joint ownership of any shared collaborative peripheral device nodes appearing in plural mesh manifests. In one embodiment, pairing of peripheral device nodes, including any collaborative peripheral device nodes, with various anchor information handling system nodes 300 may, in part, determine the roster of peripheral device nodes allocated among meshes within the collaborative peripheral device workspace. Additionally, KPIs may be reported and include, in some embodiments, processing performance KPI, battery availability KPI, audio KPIs, video KPIs, application data such as calendar data, and the like for assessment of function or suitability within these meshes. In an example embodiment where the collaborative peripheral device workspace includes a conference room workspace, some of the peripheral devices already present in the peripheral device workspace requesting to join the collaborative peripheral device workspace may not be needed, may not be suitable, and/or may not function within one particular mesh in the collaborative peripheral device workspace. For example, a user's anchor information handling system node 300 may include a wireless mouse that may be used to manipulate objects presented on a video display device within the collaborative peripheral device workspace. However, where the received KPIs from the user's anchor information handling system node 300 within joining the collaborative peripheral device workspace indicate that the wireless mouse does not have sufficient battery capacity to operate for an entire length of a scheduled videoconferencing session, the mesh created may not include the wireless mouse and instead the user may be required to operate a built-in trackpad associated with the anchor information handling system node 300.

At line 370, the execution of the computer-readable program code of the mesh manager module 368 may cause the peripheral device workspace cloud orchestrator server 358 to identify the mesh to be created via association of the mesh manifest of a subset of peripheral devices with the anchor information handling system node 300 and the anchor information handling system node 300 with other node devices, including any smart node devices or collaboratively peripheral devices, within the collaborative peripheral device workspace in an embodiment. The mesh manager module 368 may then create the mesh that associates a logical group of node devices in a mesh manifest with a mesh owner (e.g., user of the anchor information handling system node 300), create a mesh ID and associate that mesh ID with the created mesh within the collaborative peripheral device workspace. This may be done for plural meshes and mesh owners, such as users of anchor information handling system nodes 300 in the collaborative peripheral device workspace. In an embodiment, the mesh manager module 368 may save the mesh ID, a mesh manifest of the node devices within the mesh, and the associated mesh owner in a mesh manager database accessible by the peripheral device workspace cloud orchestrator server 358. In an embodiment, the created mesh with its mesh ID may also be associated with a collaborative peripheral device workspace ID of the collaborative peripheral device workspace such that as a particular anchor information handling system node 300 is onboarded and offboarded within the collaborative peripheral device workspace, a manifest of the mesh may be readily accessible to streamline the onboarding and offboarding process. At lines 372 and 380, the peripheral device workspace cloud orchestrator server 358 may transmit, via the gateway 375, the mesh ID to the anchor information handling system node 300. In an embodiment, along with the mesh ID, a mesh profile with the manifest of the peripheral device nodes, collaborative peripheral device nodes, and other nodes in the mesh may be generated by the mesh manager module 368 which may indicate to the user anchor information handling system 300 which peripheral devices are included within the created mesh and are available to the user to collaborate with other users within the collaborative peripheral device workspace. The mesh profile may also include ITDM-generated or enterprise established operational policies for nodes at the collaborative peripheral device workspace. Such a mesh profile may be requested at lines 385 and 390 by the anchor information handling system 300 via the gateway 375 from the mesh manager module 368. The execution of the computer-readable program code of the mesh manager module 368 may then transmit this mesh profile data back to the anchor information handling system node 300 at lines 395 and 397 via the gateway 375. In this way, meshes may be established within the collaborative peripheral device workspace for orchestration of management of peripheral device nodes, other nodes, and collaborative peripheral device nodes shared between meshes to disseminate instructions for operational policies and manage configurations and settings for nodes within the collaborative peripheral device workspace in embodiments herein.

Figure 4:
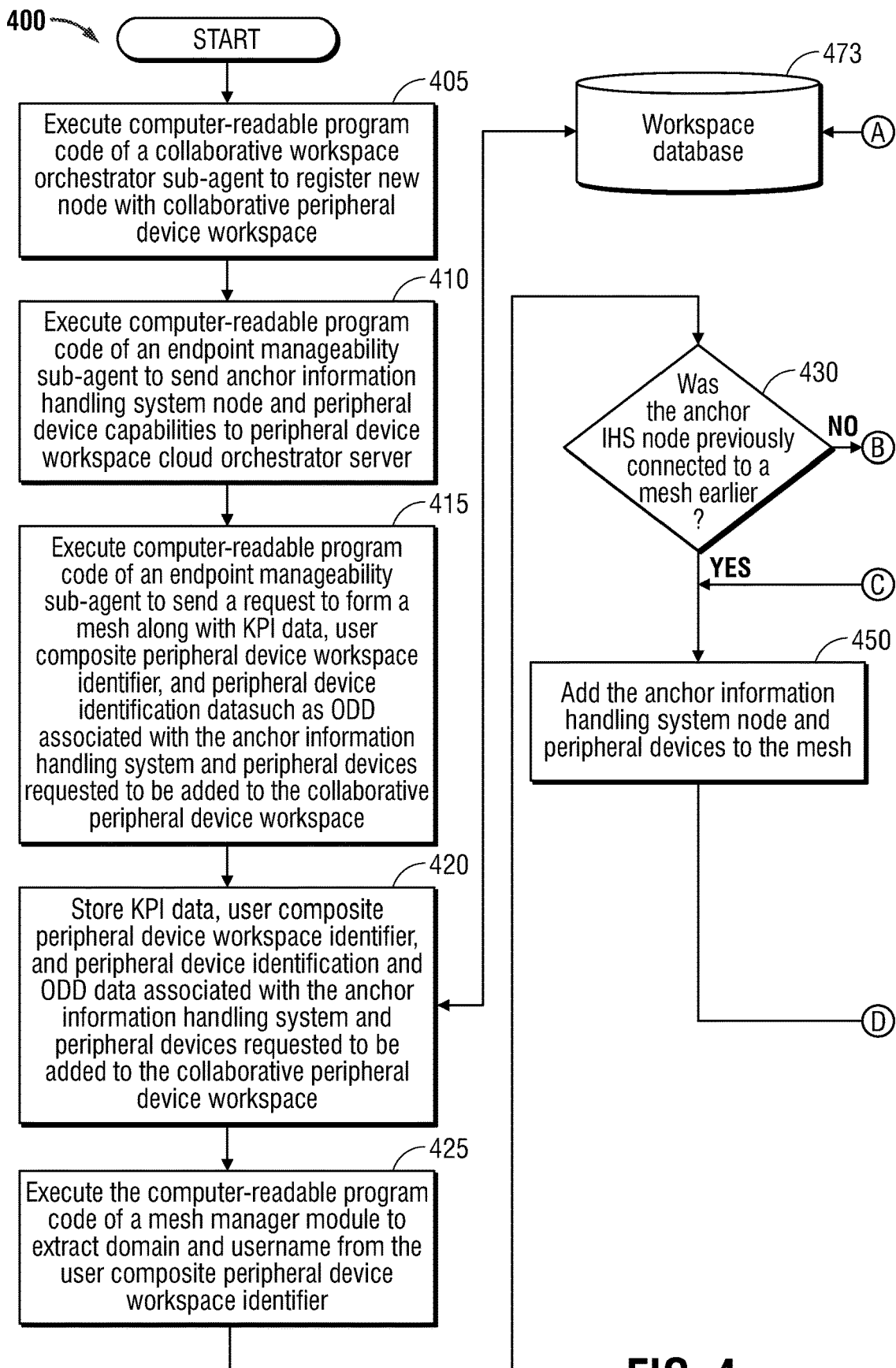
FIG. 4 is a flow chart showing a method of creating a mesh within a collaborative peripheral device workspace according to an embodiment of the present disclosure.
Figure 4:
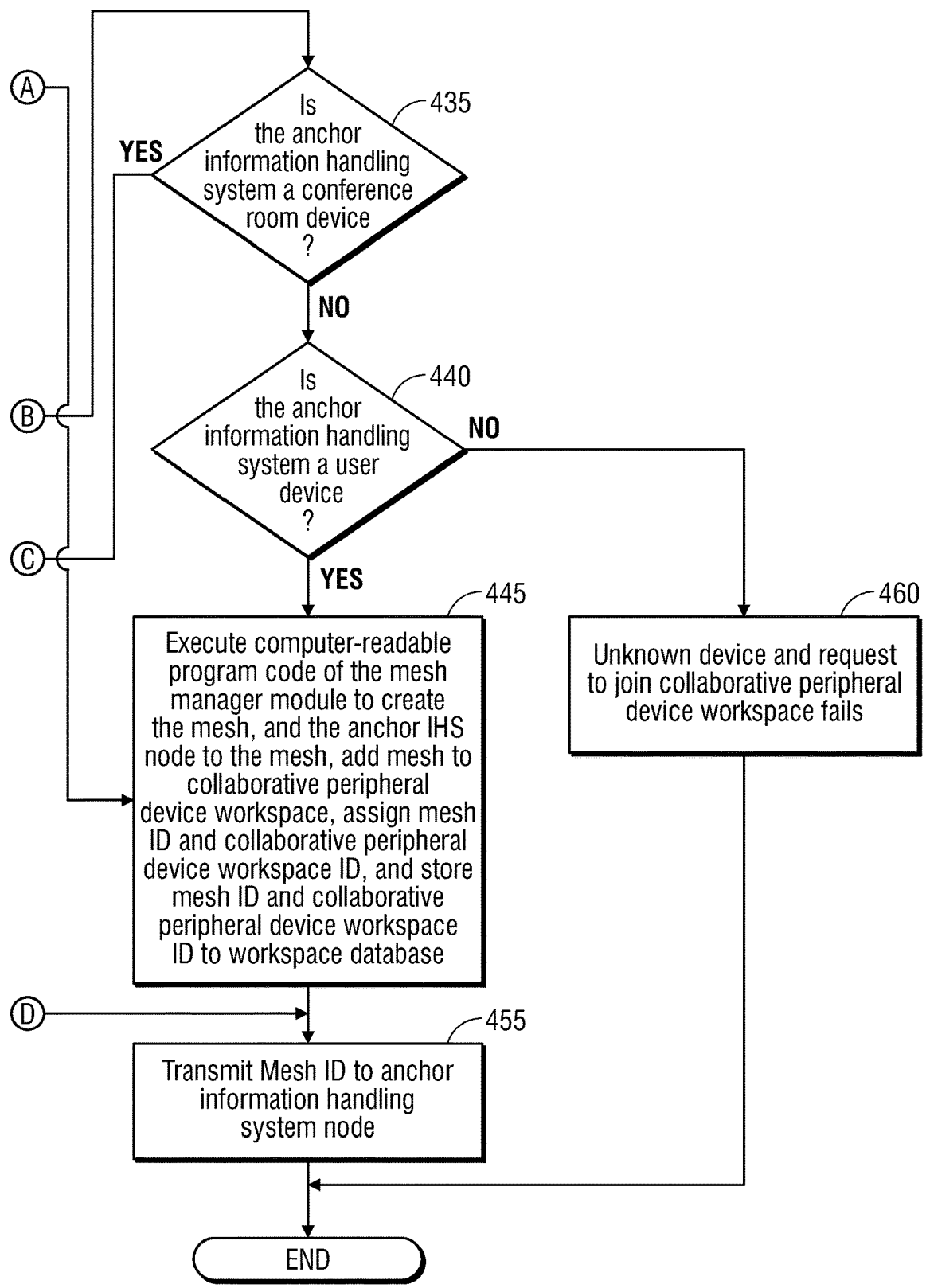

FIG. 4 is a flow chart showing a method 400 of creating a mesh within a collaborative peripheral device workspace according to an embodiment of the present disclosure. The method 400 includes, at block 405, executing computer-readable program code of a collaborative workspace orchestrator sub-agent to register new node with collaborative peripheral device workspace. In an embodiment, the registration of the new nodes may include passing peripheral device identification data to the peripheral device workspace cloud orchestrator server that allows the peripheral device workspace cloud orchestrator server to identify the device node within a collaborative peripheral device workspace. This identification data may include a make, model, type, and/or serial number associated with the device nodes and any orchestrated device descriptor (ODD) for the node including features, capabilities, and settings or configuration, such as connectivity, for the peripheral devices or other nodes being reported at a collaborative peripheral device workspace. In some embodiments, the peripheral device workspace cloud orchestrator server may access a third-party manageability agent and third-party manageability platform to identify or obtain data for the ODD for these node devices. A third-party manageability platform may include any endpoint management service such as Microsoft® Intune® that is used to help manage the peripheral devices at remote workspaces, such as for providing updates to operational configurations or settings. In other embodiments, ODD and other information for a particular peripheral device node or other node, for example, may be defined by an ITDM with policies used by the peripheral device workspace cloud orchestrator server to create the peripheral device workspaces, create the collaborative peripheral device workspaces, define the collaborative peripheral device workspaces, register peripheral devices (e.g., node devices) with the peripheral device workspace cloud orchestrator server, and modify created collaborative peripheral device workspaces each having peripheral device workspace identification values based on detected changes (e.g., inclusion of new node devices, removal of node devices, and swapping of node devices within the workspace, etc.) within any given peripheral device workspace.

Additionally, the hardware processing device of the anchor information handling system node may execute computer-readable program code of the endpoint manageability sub-agent block 410. The execution of the computer-readable program code of the endpoint manageability sub-agent causes the anchor information handling system node to send peripheral device capabilities and settings to the peripheral device workspace cloud orchestrator server for itself and one or more peripheral device nodes or other nodes within the collaborative peripheral device workspace via the gateway indicating the capabilities and settings of each associated peripheral device node or other nodes. Again, these capabilities and settings may include, for example, device descriptions, audio capabilities, video capabilities, processing resources, storage device resources, wireless or wired connection capabilities, input capabilities, output capabilities, current and available audio settings, current and available video settings, current and available input settings, current and available output settings, and the like. In the context of a collaborative peripheral device workspace being created by the execution of the computer-readable program code of the collaborative workspace orchestrator module by the hardware processing device of the peripheral device workspace cloud orchestrator server, these capabilities and settings allow the peripheral device workspace cloud orchestrator server to later define which of the peripheral devices are to be included within a mesh, what settings are to be initiated, as well as which operating policies are to be followed by the peripheral device nodes within the mesh created. In an embodiment, a notification that the capabilities and settings have been received by the peripheral device workspace cloud orchestrator server is provided to the one or more anchor information handling system nodes that enter a collaborative peripheral device workspace for one or more users.

At block 415, the anchor information handling system node may execute computer-readable program code of an endpoint manageability sub-agent to send a request to form a mesh along with KPI data, user composite peripheral device workspace identification for a user and anchor information handling system, and peripheral device identification data, such as an ODD, associated with the anchor information handling system and peripheral devices requested to be added to the mesh within the collaborative peripheral device workspace. The execution of the endpoint manageability sub-agent further causes the anchor information handling system node to send KPIs associated with each device node operatively coupled thereto, to another anchor information handling system node, or to a smart node with networking capability within the collaborative peripheral device workspace to be sent to the peripheral device workspace cloud orchestrator server via the gateway. These KPIs may include, in some embodiments, processing performance KPI, battery availability KPI, audio KPIs, video KPIs, application data such as calendar data, and the like for assessment of function or suitability within these meshes. In another example embodiment where the collaborative peripheral device workspace includes a conference room workspace, plural users with plural anchor information handling system nodes may enter to conduct collaborative work activities using an assortment of peripheral device nodes within the collaborative peripheral device workspace, including collaborative peripheral device nodes concurrently shared by anchor information handling system nodes. The meshes created upon request at block 415, may be apportioned to each anchor information handling system node for a user. Some peripheral device nodes within the collaborative peripheral device workspace may be used by only one user, while others may be collaborative peripheral device nodes shared among users. Ownership of the assortment of peripheral device nodes in the collaborative peripheral device workspace may be apportioned in meshes for orchestrated management from a remote cloud location according to ownership by particular anchor information handling system nodes of specified users. The meshes may be initially established based on operative coupling, wired or wirelessly, by each anchor information handling system node to subsets of peripheral device nodes and collaborative peripheral device nodes in the collaborative peripheral device workspace.

In another example embodiment where the collaborative peripheral device workspace includes a conference room workspace, some of the peripheral devices already present in the peripheral device workspace requesting to join the collaborative peripheral device workspace may not be needed, may not be suitable, and/or may not function within the collaborative peripheral device workspace. For example, a user's anchor information handling system node may include a wireless mouse that may be used to manipulate objects presented on a video display device within the collaborative peripheral device workspace. However, where the received KPIs from the user's anchor information handling system node within the joining peripheral device workspace indicate that the wireless mouse does not have sufficient battery capacity to operate for an entire length of a scheduled videoconferencing session, the mesh created may not include the wireless mouse and instead the user may be required to operate a built-in trackpad associated with the anchor information handling system node.

At block 420, the peripheral device workspace cloud orchestrator server may store the KPI data, user composite peripheral device workspace identifier for a user, and peripheral device identification data, such as ODD data, associated with the anchor information handling system and peripheral devices requested to be added to the collaborative peripheral device workspace and in particular meshes for a collaborative peripheral device workspace in a workspace database 473. This database 473 may be accessible by the peripheral device workspace cloud orchestrator server for later use in creating the mesh as described herein.

At block 425, the execution of the computer-readable program code of the mesh manager module at the peripheral device workspace cloud orchestrator server to extract domain and username data from the user identification associated from the user composite peripheral device workspace identifier. For example, the domain and username may be "AMERICAS\User1" with the term "AMERICAS" being the domain name and the user ID being "User1." Another example may include a domain and username as "CONFROOM\Room1" with the term "CONFROOM" being the domain name and "Room1" being the user/device node ID. This may be relevant to identifying location for the collaborative peripheral device workspace as well as for determination of user preferences or capabilities and related settings and configurations available for anchor information handling system nodes for users in the collaborative peripheral device workspace.

At block 430, the peripheral device workspace cloud orchestrator server may cross-reference the extracted domain name and user ID to determine, via execution of the computer-readable program code of the mesh manager module, whether the anchor information handling system node has previously formed part of the collaborative peripheral device workspace. Where the anchor information handling system node (and the associated peripheral devices) had been previously part of a mesh within a collaborative peripheral device workspace, the anchor information handling system node is added to the mesh within the collaborative peripheral device workspace at block 450. In an embodiment, execution of the computer-readable program code of the mesh manager module may cause the mesh manager module to access the workspace database 473 (e.g., mesh manager database 273, FIG. 2), cross-reference the domain name and username, access the device manifest for the mesh previously created, and add the anchor information handling system node to the mesh and its peripheral device nodes with previously established settings and operational policies in the collaborative peripheral device workspace as indicated in the manifest and under a mesh ID previously assigned to that mesh. For example, if connectivity was via Bluetooth® or other wireless connectivity and operational settings for KPIs and other configurations described herein were previously established under a previous mesh ID, then those connectivity and operational settings for KPIs and other configurations may be reestablished for the anchor information handling system upon reappearing in the collaborative peripheral device workspace and requesting access to a mesh. This streamlines automatic onboarding of the anchor information handling system node into the mesh within the collaborative peripheral device workspace such that a user may easily engage within the collaborative peripheral device workspace.

Where the execution of the computer-readable program code of the mesh manager module indicates that the anchor information handling system node was not previously part of a mesh at block 430, the method 400 continues to block 435 with the mesh manager module determining whether the anchor information handling system node is a conference room device. For example, an anchor information handling system node may form part of a conference room collaborative peripheral device workspace where the ITDM, via the peripheral device workspace cloud orchestrator consol, indicates that that information handling system is to form part of the conference room ecosystem at the conference room location, thereby creating a conference room peripheral device workspace. Where the anchor information handling system node does form part of a conference room collaborative peripheral device workspace and is a conference room device, the method returns to block 450 as described herein.

Where, at block 435, the anchor information handling system node is not a conference room device, the method proceeds to block 440 with determining whether the anchor information handling system node is a user device. In an embodiment, a user device may be any device that is registered with the peripheral device workspace cloud orchestrator server under a user composite peripheral device workspace identifier indicating setting preferences and capabilities or requirements established by an ITDM or enterprise for a user and her anchor information handling system as being part of remote management by the enterprise of peripheral devices and their interfacing and usage with anchor information handling systems of users within the enterprise. Where the anchor information handling system node is not detected as being a user device, the method 400 continues to block 460 with the peripheral device workspace cloud orchestrator server indicating that the device is unknown and the request to join the collaborative peripheral device workspace as a mesh device fails with the method 400 ending here. A report for an ITDM or the user may be generated at 460 indicating the failure to join a mesh in the collaborative peripheral device workspace and, in some embodiments, an indication of potential security risk may be raised.

However, where the anchor information handling system node has been identified as a user device with a user composite peripheral device workspace identifier within a workspace database 473 accessible by the peripheral device workspace cloud orchestrator, the method 400 proceeds to block 445. At block 445, the peripheral device workspace cloud orchestrator server executes computer-readable program code of the mesh manager module confirm the user composite peripheral device workspace identifier at the workspace database 473 and to create the mesh from within the collaborative peripheral device workspace, add the anchor information handling system node to the mesh manifest of the mesh, add the mesh to the collaborative peripheral device workspace. In doing so, the execution of code instructions of the mesh manager module assigns a mesh ID with the collaborative peripheral device workspace identification value with the requesting anchor information handling system node as an owner of the mesh, and store the mesh ID with the collaborative peripheral device workspace identification value to workspace database 473. In an embodiment, execution of the computer-readable program code of the mesh manager module may create the mesh that associates a logical group of node devices, including any smart nodes (e.g., docking station) and collaborative peripheral device nodes (e.g., collaborative webcam, displays, or others) in a mesh manifest with a mesh owner (e.g., user of the anchor information handling system node 300). In an embodiment, the mesh manager module may save the mesh ID, a mesh manifest of the subset of node devices within the mesh, and the associated mesh owner in the workspace database 473 (e.g., mesh manager database) accessible by the peripheral device workspace cloud orchestrator server.

In an embodiment, the created mesh with its mesh ID may also be associated with a collaborative peripheral device workspace identification value of the collaborative peripheral device workspace such that as a particular anchor information handling system node is onboarded and offboarded within the collaborative peripheral device workspace, a manifest of the mesh may be readily accessible to streamline the onboarding and offboarding process and used later when the anchor information handling system node is offboarded or onboarded. Further as operational policies for the collaborative peripheral device workspace based on detected activity, such as type of meeting scheduled in calendar, software applications executing for collaborative work, processing resource levels being consumed, or as received from other environmental context data at the collaborative peripheral device workspace, the mesh manager module may implement operational policy for controlling one or more nodes in any given mesh within the collaborative peripheral device workspace.

At block 455, the peripheral device workspace cloud orchestrator server may transmit, via the gateway, the mesh ID to the anchor information handling system node. In an embodiment, along with the mesh ID, a profile or mesh manifest of the mesh which may indicate to the user which peripheral devices are included within the created mesh and are available to the user to collaborate with other users, with other meshes owned by anchor information handling system nodes, within the collaborative peripheral device workspace. Once the mesh ID has been received by the anchor information handling system node the method 400 may end.

Figure 5:
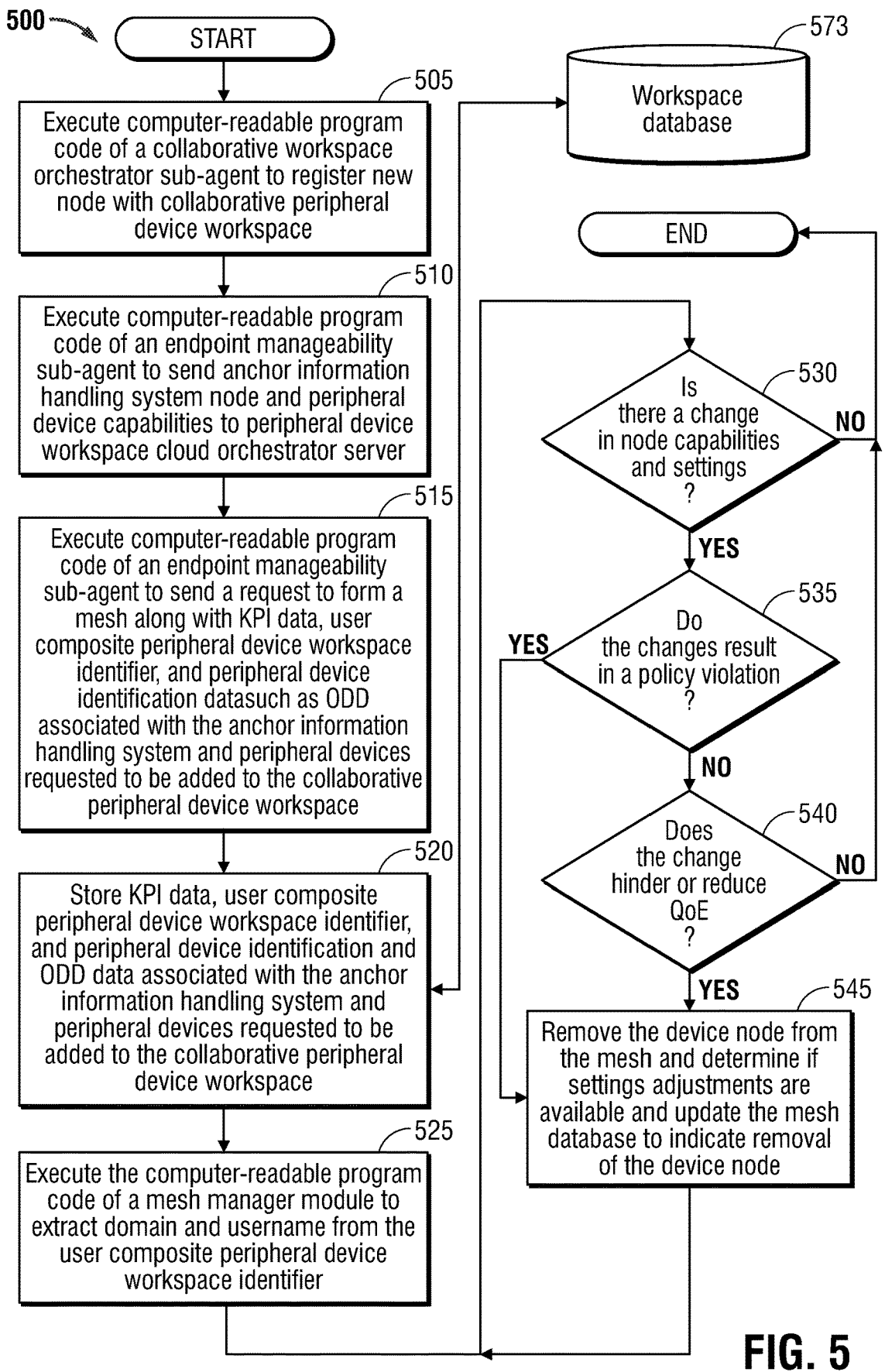
FIG. 5 is a flow chart showing method of method of creating a mesh within a collaborative peripheral device workspace and removing peripheral devices within that collaborative peripheral device workspace according to an embodiment of the present disclosure.

FIG. 5 is a flow chart showing method 500 of method of creating a mesh within a collaborative peripheral device workspace and adding or removing peripheral devices within that collaborative peripheral device workspace according to an embodiment of the present disclosure. The method 500 includes, at block 505, executing computer-readable program code of a collaborative workspace orchestrator sub-agent to register new node with collaborative peripheral device workspace. In an embodiment, the registration of the new nodes may include passing peripheral device identification data to the peripheral device workspace cloud orchestrator server that allows the peripheral device workspace cloud orchestrator server to identify the new device node, where it is a new anchor information handling system node of a user entering a collaborative peripheral device workspace or a new peripheral device node being added or brought into the collaborative peripheral device workspace by a user, such as a personal mouse peripheral device. This identification data may include a make, model, type, and/or serial number associated with the device nodes as well as any ODD data relating to the device node including features, capabilities, settings, and environmental context information relating to the operation of the device node, whether an anchor information handling system node, a smart node such as a docking station or other, a collaborative peripheral device node shared by multiple users, or a peripheral device node used by a user. In an embodiment, the peripheral device workspace cloud orchestrator server may access its workspace database 573 for a user composite peripheral device identifier for a user and ODD data to identify these node devices in a collaborative peripheral device workspace. Further, access to a third-party manageability agent and third-party manageability platform for the type of peripheral device node may further identify these node devices. A third-party manageability platform may include any endpoint management service, such as Microsoft® Intune®, that is used to help manage dissemination of updates and identify features and configuration capabilities of peripheral devices for that manufacturer at the remote workspaces. With the peripheral device workspace cloud orchestrator, for example, an ITDM to define policies used by the peripheral device workspace cloud orchestrator server to create the collaborative peripheral device workspaces, define the collaborative peripheral device workspaces, create any meshes within the collaborative peripheral device workspaces, register peripheral device nodes and other node devices such as anchor information handling system nodes or smart nodes with the peripheral device workspace cloud orchestrator server, and modify created collaborative peripheral device workspaces each having peripheral device workspace identification values based on detected changes (e.g., inclusion of new node devices, removal of node devices, and swapping of node devices within the workspace or meshes therein, etc.) within any given collaborative peripheral device workspace.

Additionally, the hardware processing device of the anchor information handling system node may execute computer-readable program code of the endpoint manageability sub-agent block 510. The execution of the computer-readable program code of the endpoint manageability sub-agent causes the anchor information handling system node to send peripheral device capabilities and settings for operatively coupled peripheral devices in the collaborative peripheral device to the peripheral device workspace cloud orchestrator server via the gateway indicating the capabilities and settings of each associated peripheral device. Additional peripheral device capabilities and settings may be sent by smart nodes such as docking stations or peripheral devices with processing and networking capabilities or by other anchor information handling systems operatively coupled to those peripheral device nodes in the collaborative peripheral device in other embodiments. Again, these capabilities and settings may include, for example, device descriptions, audio capabilities, video capabilities, processing resources, storage device resources, wireless or wired connection capabilities, input capabilities, output capabilities, current and available audio settings, current and available video settings, current and available input settings, current and available output settings, resolution, sampling or polling settings, and the like. In the context of a collaborative peripheral device workspace being created by the execution of the computer-readable program code of the collaborative workspace orchestrator module by the hardware processing device of the peripheral device workspace cloud orchestrator server, these capabilities and settings allow the peripheral device workspace cloud orchestrator server to later define which of the peripheral devices are to be included within a mesh, what settings are to be initiated, as well as which policies are to be followed by the peripheral devices within the mesh created. In an embodiment, a notification that the capabilities and settings have been received by the peripheral device workspace cloud orchestrator server is provided to the anchor information handling system node.

At block 515, the anchor information handling system node may execute computer-readable program code of an endpoint manageability sub-agent to send a request to form a mesh along with KPI data, user composite peripheral device workspace identifier for a user, and peripheral device identification data such as ODD associated data for the anchor information handling system and peripheral devices requested to be added to the collaborative peripheral device workspace in a particular mesh. This may include shared, collaborative peripheral device nodes within a collaborative peripheral device. The execution of the endpoint manageability sub-agent further causes the anchor information handling system node to send KPIs associated with each device node within the collaborative peripheral device workspace for a mesh to be sent to the peripheral device workspace cloud orchestrator server via the gateway. These KPIs may include, in some embodiments, processing performance KPI, battery availability KPI, audio KPIs, video KPIs, application data such as calendar data, and the like for assessment of function or suitability within these meshes.

In another example embodiment where the collaborative peripheral device workspace includes a conference room workspace, plural users with plural anchor information handling system nodes may enter to conduct collaborative work activities using an assortment of peripheral device nodes within the collaborative peripheral device workspace, including collaborative peripheral device nodes concurrently shared by anchor information handling system nodes. The meshes created upon request at block 415, may be apportioned to each anchor information handling system node for a user. Some peripheral device nodes within the collaborative peripheral device workspace may be used by only one user, while others may be collaborative peripheral device nodes shared among users. Ownership of the assortment of peripheral device nodes in the collaborative peripheral device workspace may be apportioned in meshes for orchestrated management from a remote cloud location according to ownership by particular anchor information handling system nodes of specified users. The meshes may be initially established based on operative coupling, wired or wirelessly, by each anchor information handling system node to subsets of peripheral device nodes and collaborative peripheral device nodes in the collaborative peripheral device workspace.

In another example embodiment where the collaborative peripheral device workspace includes a conference room workspace, some peripheral devices for an anchor information handling system node in the collaborative peripheral device workspace requesting to join a mesh in the collaborative peripheral device workspace may not be needed, may not be suitable, and/or may not function within the collaborative peripheral device workspace or in a mesh therein. For example, a user's anchor information handling system node may include a wireless mouse that may be used to manipulate objects presented on a video display device within the collaborative peripheral device workspace. However, where the received KPIs from the user's anchor information handling system node joining the collaborative peripheral device workspace indicate that the wireless mouse does not have sufficient battery capacity to operate for an entire length of a scheduled videoconferencing session, the mesh created may not include the wireless mouse and instead the user may be required to operate a built-in trackpad associated with the anchor information handling system node.

In yet another example embodiment where the collaborative peripheral device workspace includes a conference room workspace, and peripheral devices in addition to the anchor information handling system node requesting to join the collaborative peripheral device workspace may not be needed, may not be suitable, and/or may not function within the collaborative peripheral device workspace. For example, a user may bring in an anchor information handling system node and may further bring in a smart video display device or other smart peripheral device within the collaborative peripheral device workspace that may include separate outside networking capability and processing capabilities. However, where the received KPIs from the user's anchor information handling system node and associated peripheral device nodes when joining the peripheral device workspace indicate that the software and files executing or the calendar indicates that a meeting is a sensitive collaborative meeting with heightened security concerns, the mesh created may not include the smart video display device or other smart peripheral device to limit potential of transmission of sensitive data or hacking via an outside network access. Instead, the user may be required to operate a built-in video display device or a video display device that has not networking capability other than a local networking or wired connectivity to be associated with the anchor information handling system node in the collaborative peripheral device workspace in an example embodiment.

At block 520, the peripheral device workspace cloud orchestrator server may store the KPI data, user composite peripheral device, and peripheral device identification data such as ODD data associated with the anchor information handling system and peripheral devices requested to be added to the collaborative peripheral device workspace in a workspace database 573. This database 573 may be accessible by the peripheral device workspace cloud orchestrator server for later use in creating the mesh as described herein.

At block 525, the execution of the computer-readable program code of the mesh manager module at the peripheral device workspace cloud orchestrator server to extract domain and username data from the user identification from the user composite peripheral device workspace identifier for that user. For example, the domain and username may be "AMERICAS\User1" with the term "AMERICAS" being the domain name and the user ID being "User1." Another example may include a domain and username as "CONFROOM\Room1" with the term "CONFROOM" being the domain name and "Room1" being the user/device node ID. This may be relevant to identifying location for the collaborative peripheral device workspace as well as for determination of user preferences or capabilities and related settings and configurations available for anchor information handling system nodes for users in the collaborative peripheral device workspace.

At block 530, the method 500 includes determining, via execution of the computer-readable program code of the mesh manager module, whether there is a change in node capabilities and settings. During operation of the anchor information handling system node and peripheral device workspace cloud orchestrator server, each node has been registered with the peripheral device workspace cloud orchestrator server as having certain capabilities and settings from orchestrator device descriptor (ODD) information for the peripheral device that may include, for example, device descriptions, audio capabilities, video capabilities, processing resources, storage device resources, wireless or wired connection capabilities, input capabilities, output capabilities, scan rate capabilities, polling rate capabilities, resolution capabilities, as well as environmental telemetry data for the peripheral device such as current and available audio settings, current and available video settings, current and available input settings, current and available output settings, operational consumption of the above capabilities and settings, and the like. Each of these capabilities and settings are reviewed by the peripheral device workspace cloud orchestrator server to determine what capabilities of the node devices should be suppressed, if at all, and what should be the settings of the node devices, including peripheral device nodes and anchor information handling system nodes in a mesh or among meshes in the collaborative peripheral device workspace. For example, where the collaborative peripheral device workspace is a conference room collaborative peripheral device workspace, the settings on a microphone associated with a webcam (either built-in or wired/wireless) or another node may be set to mute so that certain participants cannot provide audio during the videoconferencing session. In another example, where the collaborative peripheral device workspace is a conference room collaborative peripheral device workspace, the settings on a smart node such as a smart video display device in a mesh having outside networking capabilities may be set to prevent access or activation of an outside radio or networking access so that participants cannot transmit sensitive data or content occurring during the videoconferencing session.

Where these capabilities and settings have not changed, the method 500 may end here. However, where the capabilities and settings have changed at block 530, the method 500 proceeds to block 535 with determining whether the changes result in a policy violation. Referencing the example of the microphone on a webcam, where the user changes the settings from mute to audio input, the execution of the endpoint manageability sub-agent and the mesh manager module may cause the anchor information handling system node to indicate to the mesh manager module that the user has made such a change in these settings. Referencing the example of the smart node such as a smart video display device in a mesh having outside networking capabilities, where the user changes the settings from blocking outside network access, the execution of the endpoint manageability sub-agent and the mesh manager module may cause the anchor information handling system node to indicate to the mesh manager module that the user has made such a change in these settings. The mesh manager module may then determine whether this change is a violation of policy at block 535 by referencing, for example, policies set by an ITDM at a peripheral device workspace cloud orchestrator consol and provided to the peripheral device workspace cloud orchestrator server.

If a violation of policies has occurred at block 535, the method 500 proceeds to block 545 with the mesh manager module removing the device node from the mesh and updating the mesh database 573 to indicate the removal from the mesh on the mesh manifest associated with the anchor information handling system node, its mesh (e.g., via mesh ID), and the collaborative peripheral device workspace (e.g., via a collaborative peripheral device workspace ID). The method 500 may proceed bask to block 530 with determining whether any other node devices have violated any policies set within the collaborative peripheral device workspace.

Where the change in capabilities and settings does not result in a policy violation at block 535, the method 500 may include further determining whether the change in capabilities or settings hinders or reduces the quality of experience (QoE) for the user beyond a threshold level. For example, although a user changing the settings on the microphone to allow audio input during a videoconferencing session, the audio input may be analyzed by the mesh manager module executed on the peripheral device workspace cloud orchestrator server to determine whether the audio is disruptive of the videoconferencing session beyond a threshold level such as if the audio input is too loud, comprises to much background noise, or the like. In an alternative embodiment, a determination may be made whether the settings may be adjusted or reduced to reduce the disruption to the QoE of the videoconference occurring or other activity within the collaborative peripheral device workspace. Where the QoE is reduced, the method 500 returns to block 545 with the removal of the node from the mesh manifest of devices for a mesh in the collaborative peripheral device workspace. Further, the execution of the mesh manager module at the peripheral device workspace cloud orchestrator server may assessment or determine whether adjustments in settings are available and then instructed to the peripheral device node violating operation policy. The flow then returns to block 530 to check if changes in node capabilities or settings have occurred and proceed as described above. Where the QoE is not determined to have been reduced, the method 500 may end.

The blocks of the flow diagrams of FIG. 4-6 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps, or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A peripheral device workspace cloud orchestrator server, comprising:
   a hardware processor;
   a memory device;
   a power management unit (PMU) to provide power to the hardware processor and memory device;
   a network interface device to receive operational capabilities and settings associated with a plurality of peripheral devices operatively coupled to an anchor information handling system node at a location, the anchor information handling system node and a peripheral device workspace manifest of peripheral device nodes for the peripheral devices at the location with a location identifier forming part of a collaborative peripheral device workspace to be registered with the peripheral device workspace cloud orchestrator server;
   the hardware processor to execute computer-readable program code of a collaborative workspace orchestrator module to register the peripheral device among the manifest of peripheral device nodes and the anchor information handling system node within the collaborative peripheral device workspace, assign a collaborative peripheral device workspace identification value for the location to the created collaborative peripheral device workspace, create the peripheral device workspace manifest of the peripheral device as a peripheral device node and the anchor information handling system node within the collaborative peripheral device workspace, and receive hardware device key performance indicators (KPIs) that describe operational capabilities, performance metrics, and operating characteristics of the registered peripheral device node; and
   the hardware processor to execute computer code of mesh manager module to identify and create a mesh within the collaborative peripheral device workspace including the anchor information handling system node and registered peripheral device nodes, the mesh created based on the KPIs of the registered peripheral device and assigned a mesh ID value.

2. The peripheral device workspace cloud orchestrator server of claim 1, wherein execution of the cloud manageability orchestrator module registers a plurality of peripheral device nodes including a collaborative peripheral device node used by a plurality of users in the mesh within the collaborative peripheral device workspace.

3. The peripheral device workspace cloud orchestrator server of claim 1 further comprising:
   the collaborative peripheral device workspace including a plurality of meshes created by the execution of the computer-readable program code of the mesh manager module by the hardware processor of the peripheral device workspace cloud orchestrator server and each identified by a mesh ID.

4. The peripheral device workspace cloud orchestrator server of claim 1 further comprising:
   the collaborative peripheral device workspace registering a plurality of anchor information handling system nodes in the collaborative peripheral device workspace each including a subset of the plurality of peripheral devices in the collaborative peripheral device workspace to form a plurality of meshes created by the execution of the computer-readable program code of the mesh manager module by the hardware processor of the peripheral device workspace cloud orchestrator server and each identified by a mesh ID.

5. The peripheral device workspace cloud orchestrator server of claim 1 further comprising:
   a peripheral device workspace cloud orchestrator console operatively coupled to the could orchestrator server to receive input from an internet decision maker (ITDM) to review data associated with the collaborative peripheral device workspace and to create the hardware device operational policies that define the collaborative peripheral device workspace with the one or more peripheral device nodes forming part of the collaborative peripheral device workspace.

6. The peripheral device workspace cloud orchestrator server of claim 1 further comprising:
   a mesh manager database to store the mesh ID value, the hardware device KPIs, the peripheral device workspace manifest, a manifest of peripheral devices in the mesh, and collaborative peripheral device workspace identification value.

7. The peripheral device workspace cloud orchestrator server of claim 1, wherein execution of the cloud manageability orchestrator module causes peripheral device nodes identified in the collaborative peripheral device workspace having the collaborative peripheral device workspace identification value to receive firmware and software updates.

8. The peripheral device workspace cloud orchestrator server of claim 1, wherein the hardware processor receives the device enrollment data from an anchor node information handling including a hardware processor executing an ecosystem manageability sub-agent that gathers the device enrollment data from the peripheral device nodes forming part of the collaborative peripheral device workspace and delivers that device enrollment data from the peripheral device nodes to the peripheral device workspace cloud orchestrator server.

9. A method of creating a mesh within a collaborative peripheral device workspace comprising:
   executing computer-readable program code of a collaborative workspace orchestrator module at a peripheral device workspace cloud orchestrator server to register a plurality of peripheral device nodes within a collaborative peripheral device workspace at a location, assign a collaborative peripheral device workspace identification value to the created collaborative peripheral device workspace, create a peripheral device workspace manifest of the plurality of peripheral device nodes and a plurality of anchor information handling system nodes within the collaborative peripheral device workspace, wherein at least one of the plurality of peripheral device nodes is a collaborative peripheral device node used by a plurality of users in the collaborative peripheral device workspace;
   executing computer-readable program code of the collaborative workspace orchestrator module to receive hardware device key performance indicators (KPIs) that describe operational capabilities, performance metrics, and operating characteristics of the plurality of peripheral device nodes within the collaborative peripheral device workspace; and
   executing computer code of a mesh manager module to identify and create a mesh within the collaborative peripheral device workspace and for the mesh include at least one anchor information handling system node and a subset of the plurality of peripheral devices including the at least one collaborative peripheral device node operatively coupled to the at least one anchor node information handling system node, wherein the mesh is created based on the KPIs of the plurality of peripheral devices and the at least one anchor information handling system node and the mesh assigned a mesh ID value.

10. The method of claim 9 further comprising:
forming the collaborative peripheral device workspace to include a plurality of meshes each for a plurality of anchor information handling system nodes of users created by the execution of the computer-readable program code of the mesh manager module by the hardware processor of the peripheral device workspace cloud orchestrator server and each identified by a mesh ID.

11. The method of claim 9 further comprising:
executing the computer-readable program code of the mesh manager module by the hardware processor of the peripheral device workspace cloud orchestrator server to register subsets of the plurality of peripheral devices in the collaborative peripheral device workspace each for one of a plurality of anchor information handling system nodes to form a plurality of meshes that are each identified by a mesh ID.

12. The method of claim 9 further comprising:
receiving input at a peripheral device workspace cloud orchestrator console operatively coupled to the peripheral device workspace cloud orchestrator server from an internet decision maker (ITDM) to create the hardware device operational policies for the one or more peripheral device nodes forming part of the collaborative peripheral device workspace based on data associated with the collaborative peripheral device workspace.

13. The method of claim 9 further comprising:
storing, at a mesh manager database, the mesh ID value for the mesh, the hardware device KPIs, the peripheral device workspace manifest, a manifest of peripheral devices in the mesh, and collaborative peripheral device workspace identification value.

14. The method of claim 9 further comprising:
executing the computer-readable program code of the mesh manager module by the hardware processor of the peripheral device workspace cloud orchestrator server to determine operational policy violations for identifying a policy-violating peripheral device node identified in the mesh of the collaborative peripheral device workspace and limit operation of the policy-violating peripheral device node in the mesh of the collaborative peripheral device workspace.

15. The method of claim 9, wherein the hardware processor receives the device enrollment data from the at least one anchor node information handling node including a hardware processor executing an ecosystem manageability sub-agent that gathers the device enrollment data from the subset of peripheral device nodes forming the mesh in the collaborative peripheral device workspace and delivers that device enrollment data from the peripheral device nodes to the peripheral device workspace cloud orchestrator server.

16. The method of claim 9 further comprising:
registering a plurality of anchor information handling system nodes in the collaborative peripheral device workspace each including subsets of the plurality of peripheral devices in the collaborative peripheral device workspace to form a plurality of meshes created by the execution of the computer-readable program code of the mesh manager module by the hardware processor of the peripheral device workspace cloud orchestrator server and each identified by a mesh ID, where at least one peripheral device node is a collaborative peripheral device node shared among the subsets of the plurality of peripheral devices for the plurality of meshes.

17. A peripheral device workspace cloud orchestrator server, comprising:
a hardware processor;
a memory device;
a power management unit (PMU) to provide power to the hardware processor and memory device; and
a network interface device to receive operational capabilities and settings associated with a first subset of a plurality of peripheral device nodes operatively coupled to a first anchor information handling system node and a second subset of the plurality of peripheral device nodes operatively coupled to a second anchor information handling system node, where the first and second anchor information handling system nodes and the plurality of peripheral device nodes form a collaborative peripheral device workspace at a location to be registered with the peripheral device workspace cloud orchestrator server; and
the hardware processor to execute computer-readable program code of a collaborative workspace orchestrator module to register the plurality of peripheral device nodes within the collaborative peripheral device workspace, assign a collaborative peripheral device workspace identification value to the created collaborative peripheral device workspace, create a peripheral device workspace manifest of the plurality of peripheral device nodes and the first and second anchor information handling system nodes within the collaborative peripheral device workspace, and receive hardware device key performance indicators (KPIs) that describe operational capabilities, performance metrics, and operating characteristics of the registered peripheral device nodes;
the hardware processor to execute computer code of mesh manager module to identify and create a first mesh within the collaborative peripheral device workspace including the first anchor information handling system node and the first subset of peripheral devices and a second mesh within the collaborative peripheral device workspace including the second anchor information handling system node and the second subset of peripheral devices, wherein the first mesh and the second mesh are created based on the KPIs of the registered peripheral devices and wherein the first mesh and the second mesh are assigned a first mesh ID value and a second mesh ID value respectively; and
a mesh manager database to store the first mesh ID value and the second mesh ID value, the hardware device KPIs for the peripheral devices, the peripheral device workspace manifest, a first mesh manifest of the first subset of peripheral devices for the first mesh, a second mesh manifest of the second subset of peripheral devices for the second mesh, and the collaborative peripheral device workspace identification value.

18. The peripheral device workspace cloud orchestrator server of claim 17 further comprising:
the first manifest of the first subset of peripheral devices for the first mesh and the second manifest of the second subset of peripheral devices for the second mesh both include a collaborative peripheral device node in the collaborative peripheral device workspace.

19. The peripheral device workspace cloud orchestrator server of claim 17, wherein the hardware processor receives the device enrollment data from an anchor node information handling including a hardware processor executing an ecosystem manageability sub-agent that gathers the device enrollment data from the peripheral device nodes forming the collaborative peripheral device workspace and delivers that device enrollment data from the peripheral device nodes to the peripheral device workspace cloud orchestrator server.

20. The peripheral device workspace cloud orchestrator server of claim 17 further comprising:
   the hardware processor of the peripheral device workspace cloud orchestrator server executing the computer-readable program code of the mesh manager module to determine operational policy violations for identifying a policy-violating peripheral device node identified in the collaborative peripheral device workspace and limit operation of the policy-violating peripheral device node in the first mesh or second mesh of the collaborative peripheral device workspace having the policy-violating peripheral device node in its first mesh manifest or second mesh manifest.

* * * * *